(12) United States Patent
Balsara et al.

(10) Patent No.: US 8,440,765 B2
(45) Date of Patent: May 14, 2013

(54) NANOSTRUCTURED POLYMER MEMBRANES FOR SELECTIVE ALCOHOL TRANSPORT

(75) Inventors: Nitash P. Balsara, El Cerrito, CA (US); Ashish K. Jha, Berkeley, CA (US); Liang Chen, Midland, MI (US)

(73) Assignee: The Regents of the University of California, Oakland, CA (US)

( * ) Notice: Subject to any disclaimer, the term of this patent is extended or adjusted under 35 U.S.C. 154(b) by 63 days.

(21) Appl. No.: 13/045,328

(22) Filed: Mar. 10, 2011

(65) Prior Publication Data

US 2012/0142865 A1    Jun. 7, 2012

Related U.S. Application Data

(60) Provisional application No. 61/313,618, filed on Mar. 12, 2010.

(51) Int. Cl.
| | |
|---|---|
| *C08G 81/02* | (2006.01) |
| *C07C 29/76* | (2006.01) |
| *C08F 230/08* | (2006.01) |
| *C08F 232/08* | (2006.01) |

(52) U.S. Cl.
USPC ................ 525/104; 526/279; 568/913

(58) Field of Classification Search .................. None
See application file for complete search history.

(56) References Cited

U.S. PATENT DOCUMENTS

| | | | | |
|---|---|---|---|---|
| 4,599,440 | A * | 7/1986 | Watanabe et al. | 556/460 |
| 6,649,707 | B1 * | 11/2003 | Rhodes et al. | 525/479 |
| 7,449,540 | B2 * | 11/2008 | Arai | 528/40 |
| 2005/0080154 | A1 * | 4/2005 | Tabei | 522/148 |
| 2007/0249796 | A1 * | 10/2007 | Arai et al. | 526/279 |
| 2008/0114087 | A1 | 5/2008 | Sikdar et al. | |
| 2010/0190950 | A1 * | 7/2010 | Tetsuka et al. | 528/15 |

FOREIGN PATENT DOCUMENTS

| | | |
|---|---|---|
| WO | 00/55218 A1 | 9/2000 |
| WO | 2010/121270 A1 | 10/2010 |

OTHER PUBLICATIONS

Katsumata et al. "Synthesis and properties of polynorbornenes bearing oligomeric siloxane pendant groups" Polymer 2009(50), 1389-1394.*

Tetsuka et al. "Synthesis and Properties of Addition-Type Poly(norbornene)s with Siloxane Substituents" Polymer Journal, 2009, 41(8), 643-649.*

(Continued)

*Primary Examiner* — Robert S Loewe
(74) *Attorney, Agent, or Firm* — Morrison & Foerster LLP

(57) ABSTRACT

The present invention relates to copolymer compositions for alcohol-selective membranes and methods of selectively separating an alcohol such as ethanol from an aqueous solution using such membranes. The copolymer compositions may be block copolymers of polystyrene-polybutadiene-polystyrene (hereafter "SBS") having cylindrical morphologies; graft diblock copolymers synthesized by ring-opening metathesis polymerization of two cycloalkene monomers, wherein at least one of the cycloalkene monomers is substituted with one or more polydialkylsiloxane groups; or triblock copolymers comprising a middle block comprising a polymerized cycloalkene monomer and two end groups. The synthesized graft and triblock copolymer compositions may have a spherical, lamellar, cylindrical, double diamond, or gyroid morphologies. The copolymer compositions may contain a structural block that imparts essential mechanical properties to the membrane (e.g., polystyrene) and may also contain an alcohol transporting block (e.g., polydimethylsiloxane or polybutadiene). The copolymer compositions may have a domain spacing and a flux, where the flux increases as the domain spacing increases. The copolymer compositions may also have an alcohol separation factor that increases as the domain spacing increases. The separation method may be carried out using pervaporation or vapor permeation techniques.

16 Claims, 18 Drawing Sheets

OTHER PUBLICATIONS

Mather et al. "Mechanical Relaxation and Microstructure of Poly(norbornyl-POSS) Copolymers" Macromolecules, 1999, 32, 1194-1203.*

Invitation to Pay Additional Fees received for PCT Patent Application No. PCT/US2011/027871, mailed on Jul. 25, 2011, 7 pages.

International Search Report and Written Opinion received for PCT Patent Application No. PCT/US2011/027871, mailed on Dec. 29, 2011, 18 pages.

Kawakami, Yusuke, "Molecular Design and Functionality of Branched Polymers", Progress in Polymer Science, vol. 19, 1994, pp. 203-232.

Mahanthappa et al., "Synthesis of ABA Triblock Copolymers by a Tandem ROMP-RAFT Strategy", Macromolecules, vol. 38, No. 19, 2005, pp. 7890-7894.

Li et al., "Novel Liquid Crystalline Block Copolymers by ATRP and ROMP", Macromolecules, vol. 36, No. 7, 2003, pp. 2284-2292.

Rhim et al., "On the Prediction of Separation Factor and Permeability in the Separation of Binary Mixtures by Pervaporation", Journal of Membrane Science, vol. 46, Elsevier Science Publishers B.V., Amsterdam, 1989, pp. 335-348.

Wijmans et al., "The Solution-Diffusion Model: a Review", Journal of Membrane Science, Elsevier, vol. 107, 1995, pp. 1-21.

Vane, Leland M., "A Review of Pervaporation for Product Recovery from Biomass Fermentation Processes", Journal of Chemical Technology and Biotechnology, vol. 80, 2005, pp. 603-629.

Wijmans et al., "A Simple Predictive Treatment of the Permeation process in Pervaporation", Journal of Membrane Science, vol. 79, Elsevier Science Publishers B.V., Amsterdam, 1993, pp. 101-113.

Kang et al., "Composite Membranes of Poly (1-trimethylsilyl-1-propyne) and Poly (dimethyl Siloxane) and Their Pervaporation Properties for Ethanol-Water Mixture", Journal of Applied Polymer Science, vol. 53, 1994, pp. 317-323.

Nagase et al., "Chemical Modification of Poly(substituted-Acetylene). III. Synthesis and GAS Permeability of Poly(1-phenyl-1-Pmpyne) / Poly(dimethylsiloxane) Graft Copolymer", Journal of Polymer Science: Part A: Polymer Cheslistry, vol. 26, No. 11, Oct. 1988, pp. 3131-3137.

Miyata et al., "Morphological Effects of Microphase Separation on the Permselectivity for Aqueous Ethanol Solutions of Block and Graft Copolymer Membranes Containing Poly(dimethylsilioxane)", Macromolecules, vol. 32, 1999,pp. 3712-3720.

Takegami et al., "Pervaporation of Ethanol/water Mixtures using Novel Hydrophobic Membranes Containing Polydimethylsiloxane", Journal of Membrane Science, vol. 75, Elsevier Science Publishers B.V., Amsterdam, 1992, pp. 93-105.

Nagase et al., "Preparation of polyimide/polydimethylsiloxane Graft Copolymer and its Permeabilities for Gases and Liquids", Makromol. Chem., vol. 191, 1990, pp. 2413-2421.

Desimone et al., "Synthesis and Bulk, Surface, and Microlithographic Characterization of Poly(1-butene sulfone)-g-poly(dimethylsi1oxane)", Macromolecules, vol. 24, 1991, pp. 5330-5339.

Lipian et al., "Addition Polymerization of Norbornene-Type Monomers. High Activity Cationic Allyl Palladium Catalysts", Macromolecules, vol. 35, 2002, pp. 8969-8977.

Xia et al., "Controlled/"Living" Radical Polymerization. Atom Transfer Radical Polymerization Using Multidentate Amine Ligands", Macromolecules, vol. 30, 1997, pp. 7697-7700.

Klinke et al., "Inhibition of Ethanol-Producing Yeast and Bacteria by Degradation Products Produced during Pre-treatment of Biomass", Applied Microbiology Biotechnology, vol. 66, 2004, pp. 10-26.

Palmqvist et al., "Fermentation of Lignocellulosic Hydrolysates. II: Inhibitors and Mechanisms of Inhibition", Bioresource Technology, vol. 74, 2000, pp. 25-33.

Madson et al., "Recovery of Volatile Products from Dilute High-Fouling Process Streams", Applied Biochemistry and Biotechnology, vol. 84-86, 2000, pp. 1049-1061.

Baker, Richard W., "Membrane Technology and Applications", John Wiley Sons, Ltd., Second Edition, 2004, 11 pages.

Groot et al., "Increase of Subsrate Conversion by Pervaporation in the Coninuous Butanol Fermentation", Biotechnology Letters, vol. 6, No. 12, 1984, pp. 789-792.

O'Brien et al., "Ethanol Production in a Continuous Fermentation/Membrane Pervaporation System", Appl Microbiol Biotechnol, vol. 44, 1996, pp. 699-704.

Hamley, Ian W., "The Physics of Block Copolymers", Hardback, 1999, 1 page.

Khandpur et al., "Polyisoprene-Polystyrene Diblock Copolymer Phase Diagram near the Order-Disorder Transition", Macromolecules, vol. 28, 1995, pp. 8796-8806.

Leibler, Ludwik, "Theory of Microphase Separation in Block Copolymers", Macromolecules, vol. 13, 1980,pp. 1602-1617.

Hadjichristidis et al., "Anionic Polymerizaton: High Vacuum Techniques", Journal of Polymer Science: Part A: Polymer Chemistry, vol. 38, 2000, pp. 3211-3234.

Iwatsubo et al., "Relationship between Permselectivity and Permeability in Pervaporation of Water/Alcohol Mixture", Journal of Membrane Science, vol. 65, 1992, pp. 51-58.

Mulder et al., "Preferential Sorption Versus Preferential Permeability in Pervaporation", Journal of Membrane Science, vol. 22, 1985, pp. 155-173.

Yoshikawa et al., "Specialty Polymeric Membranes 2. Pervaporation Separation of Aqueous Lower Alcohol Solutions through Modified Polybutadiene Membranes", Journal of Membrane Science, vol. 89, 1994, pp. 23-36.

Xie et al., "Amphiphilic ABA Triblock Copolymers via Combination of ROMP and ATRP in ionic liquid: Synthesis: Characterization, and Self-Assembly", Reactive & Functional Polymers, vol. 68, 2008, pp. 1601-1608.

Sun et al., "Membranes of Block Copolymer-poly(divinylbenzene) blends for the pervaporation of Alcohol/Water Mixtures", Journal of Membrane Science, vol. 90, 1994, pp. 275-282.

Jha, Ashish, "Effect of Membrane Morphology on Ethanol Pervaporation", American Physical Society March Meeting (APS), Dallas, TX, Mar. 22, 2011,10 pages.

Floudas et al., "Nucleation and Growth in order-to-order Transitions of a Block Copolymer", Europhysics Letters, vol. 50, No. 2, 2000, Abstract Only.

Floudas et al., "Order-to-order transitions in poly(isoprene-ethylene oxide) diblock copolymers", Abstracts of Papers of the American Chemical Society, vol. 218, 1999, pp. U567-U567.

* cited by examiner

NANOSTRUCTURED POLYMER MEMBRANES FOR SELECTIVE ALCOHOL TRANSPORT

CROSS REFERENCE TO RELATED APPLICATIONS

This application claims the benefit of U.S. Provisional Patent Application Ser. No. 61/313,618 filed on Mar. 12, 2010, which is incorporated herein by reference in its entirety for all purposes.

BACKGROUND

1. Field

The present disclosure relates generally to methods of selectively separating an alcohol from an aqueous mixture using membranes derived from copolymer compositions; more specifically it relates to methods of selectively separating ethanol from an aqueous mixture using membranes derived from polystyrene-polybutadiene-polystyrene block copolymers having a cylindrical morphology or from copolymers of ring-opening metathesis polymerization, where one of the cycloalkene monomers is substituted with one or more polydialkylsiloxane groups.

2. Related Art

The use of renewable feedstocks for conversion to transportation fuels is growing rapidly. As corn grain use plateaus, the next large source of feedstock is lignocellulosic biomass. A difficulty with this source is that the fermentable C6 sugars that may be derived from its cellulose content (~44%) are less concentrated than those that are derived from high starch (~66%) grains. Significant amounts of hemicellulose (~30%) drive up the viscosity in the fermentor. In addition, fermentation inhibitors will be present, though this depends on the pretreatment hydrolysis method. For these reasons, lignocellulose-based fermentations are run more dilute than high starch grain fermentations, and the alcohol product is necessarily significantly less concentrated. This is a problem when distillation is used as the alcohol recovery method. In modern corn dry-grind ethanol plants with significant heat integration, the energy to distill the 10-13 wt % ethanol feed and dehydrate it to fuel specification is equivalent to ~20% of its lower heating value. As feed concentration drops (i.e. for lignocellulosic feedstocks), energy use (and cost) rises exponentially. Butanol produced by fermentation is even more dilute, as the product is a much stronger inhibitor to the fermenting microorganisms than ethanol. Typical butanol fermentations result in 1-2 wt % butanol in the broth.

A potentially lower-energy alternative to distillation for recovery of ethanol or other alcohols is membrane permeation. The process may be vapor permeation (vapor feed/vapor permeate) or pervaporation (liquid feed/vapor permeate). Pervaporation is already in commercial use for dehydration of ethanol (4-20 wt % water content) and other solvents by permeation through water-selective membranes. Permeation of the minor component is preferred, to minimize the membrane area required. Currently alcohol-selective membrane materials have not been found that perform well enough to compete commercially with distillation. The reason is that the majority of membranes are water-selective. Permeation selectivity is the product of solubility selectivity and diffusivity selectivity. Water, being a smaller molecule than the alcohols, diffuses faster. Water-selective membranes such as polyvinyl alcohol (PVA) have pervaporation process separation factors above 200, compared to ~9 for polydimethylsiloxane (PDMS) permeating ethanol. Besides the potential for energy savings, particularly for lower concentration feeds, membrane permeation lends itself to continuous removal of the product as it is formed. This may result in higher fermentor productivity, and higher yields. This is especially important for the production of butanol, where inhibition occurs well-before available sugar is consumed.

A variety of alcohol-selective membrane materials have been investigated including individual polymers, polymer blends, block copolymers, interpenetrating network polymer blends, surface-modified polymers, hydrophobic zeolite crystals intergrown to form a film, polymer-coated zeolite films, mixed matrix membranes incorporating zeolite particles into a polymer matrix, and liquid membranes. The membranes that have resulted from these approaches have their individual strengths and weaknesses, but none have resulted in a commercial application for alcohol recovery. Silicone rubber polydimethylsiloxane (PDMS) has demonstrated some success in alcohol pervaporations, and crosslinking of PDMS is typically needed to enhance the mechanical stability of the membranes. Crosslinked PDMS membranes exhibit an ethanol/water selectivity of 9. Additionally, block copolymers containing a PDMS block have been explored. For example, graft copolymers consisting of a poly(1-trimethylsilylpropyne) (PTMSP) backbone with PDMS grafts and of a poly(1-phenylpropyne) (PPP) backbone with PDMS grafts exhibited high ethanol/water selectivities of 28 and 40, respectively, but were shown to give unstable performance with flux and selectivity declining with time. Other block copolymers containing PDMS, such as polymethylmethacrylate (PMMA)-block (or graft)-PDMS, polystyrene (PS)-graft-PDMS, and polysulfone-graft-PDMS, have shown ethanol separation behavior similar to crosslinked PDMS membranes. Due to the low mechanical stability of the matrix phase (e.g. PS, PMMA), the resultant copolymer membranes were brittle and difficult to handle. Moreover, the effects of the PDMS size and morphology have not been explicitly addressed in those examples. Thus, there is a need for better-performing alcohol-selective membranes.

SUMMARY

The present invention provides copolymer compositions for alcohol-selective membranes and methods of selectively separating an alcohol from an aqueous solution using such membranes. More specifically, the present invention utilizes membrane materials such as polystyrene-polybutadiene-polystyrene (SBS) copolymers with cylindrical morphology or copolymers synthesized from a first cycloalkene monomer and a second cycloalkene monomer, wherein the second cycloalkene monomer is substituted with one or more polydialkylsiloxane groups, to selectively separate an alcohol from an aqueous solution by pervaporation or vapor permeation. The synthesized polymers may have lamellar, cylindrical, or gyroid morphologies.

In some embodiments, the polydialkylsiloxane groups comprise between 20-60 wt % of the copolymer. In other embodiments, the polydialkylsiloxane groups comprise between about 35-45 wt % of the copolymer.

In some embodiments the polydialkylsiloxane is polydimethylsiloxane.

In some embodiments, the first cycloalkene monomer is an optionally substituted ring selected from the group consisting of cyclopentene, cyclohexene, cycloheptene, cyclooctene, cyclononene, cyclodecene, norbornene, and cyclooctadiene. In some preferred embodiments, the first cycloalkene monomer is substituted or unsubstituted cyclooctene.

In some embodiments, the molar ratio of the first cycloalkene monomer and the second cycloalkene monomer in the copolymer is 5-30. In other embodiments, the molar ratio of the first cycloalkene monomer and the second cycloalkene monomer is 10-20.

In some embodiments, the second cycloalkene monomer is an optionally substituted norbornene. In some preferred embodiments, the second cycloalkene monomer is 2-polydimethylsiloxyl-5-norbornene.

In some embodiments, the copolymer is a graft copolymer.

In some embodiments, the copolymer is unsaturated or saturated.

In some embodiments, the copolymer has a cylindrical, lamellar, double diamond, or gyroid morphology. In some preferred embodiments where the copolymer material comprises a styrene-butadiene-styrene (SBS) copolymer, the SBS copolymer has a cylindrical morphology.

The invention further provides a composition comprising a ring-opening, olefin metathesis polymerization catalyst and a first cycloalkene monomer and a second cycloalkene monomer, wherein the second cycloalkene monomer is substituted with one or more polydialkylsiloxane groups.

The invention further provides a method of synthesizing a copolymer composition comprising reacting the first cycloalkene monomer and second cycloalkene monomer with a ring-opening, olefin metathesis polymerization catalyst, wherein the second cycloalkene monomer is substituted with one or more polydialkylsiloxane groups.

The invention further provides a copolymer comprising a middle section formed from a cycloalkene monomer and two end groups, the end groups comprising a polymer selected from the group consisting of polydialkylsiloxane, poly(alkylacrylate), poly(alkylmethacrylate), and poly(propylene oxide). In some embodiments, the polydialkylsiloxane is polydimethylsiloxane. In some embodiments, the poly(alkylmethacrylate) is poly(n-butylmethacrylate). In some embodiments, the poly(propylene oxide) end groups are (meth)acrylate-terminated. In some embodiments, the copolymer is a triblock copolymer. In some embodiments the cycloalkene monomer is selected from the group consisting of cyclopentene, cyclohexene, cycloheptene, cyclooctene, cyclononene, cyclodecene, cyclooctadiene, and norbornene. In some preferred embodiments, the cycloalkene monomer is cyclooctene. In some embodiments, the copolymer has a cylindrical, lamellar, double diamond, or gyroid morphology.

The invention further provides a membrane comprising the copolymer compositions described herein. In some embodiments, the membrane has a thickness between 20-150 µm. In some embodiments, the membrane has a thickness between 20-50 µm. In some embodiments, the membranes may be supported on, for example, a ceramic porous support. Other membrane supports are well-known in the art. Supported membranes may have smaller thicknesses than the unsupported membranes between 1-20 µm. In some embodiments, the supported membranes may have a thickness between 1-5 µm. Thickness, as used herein, refers to the average thickness of 20-50 measurement points over the entire membrane area. Other methods of determining average thickness of a membrane are well-known in the art.

The invention further provides a method of selectively separating an alcohol from an aqueous mixture, the method comprising:

(a) providing a membrane comprising at least one of the copolymer compositions described herein; and (b) contacting the aqueous mixture with the membrane by pervaporation or vapor permeation to selectively separate the alcohol from the aqueous mixture, wherein the alcohol passes through the membrane for collection.

The invention further provides a method of selectively separating an alcohol from an aqueous mixture, the method comprising:

(a) providing an alcohol-selective membrane comprising a copolymer composition having a cylindrical morphology; and (b) contacting the aqueous mixture with the alcohol-selective membrane whereby the alcohol passes through the membrane by pervaporation or vapor permeation to selectively transport the alcohol from the aqueous mixture through the membrane. In some preferred embodiments, the alcohol-selective membrane comprises an SBS copolymer composition. In some embodiments, the alcohol selectivity is at least 5. In some embodiments, the alcohol selectivity is at least 10. In some embodiments, the alcohol is ethanol or butanol. In some embodiments, the alcohol is ethanol.

The present invention also provides copolymers comprising a block of polymerized cycloalkene monomer and two end groups, the end groups selected from the group consisting of polydialkylsiloxane, poly(alkylacrylate), poly(alkylmethacrylate), and poly(propylene oxide). In some embodiments, the polydialkylsiloxane is polydimethylsiloxane. In some embodiments, the poly(alkylmethacrylate) is poly(n-butylmethacrylate). In some embodiments, the poly(propylene oxide) end groups are (meth)acrylate-terminated. In some embodiments, the copolymer is a triblock copolymer. In some embodiments, the cycloalkene monomer is selected from the group consisting of cyclopentene, cyclohexene, cycloheptene, cyclooctene, cyclononene, cyclodecene, cyclooctadiene, and norbornene. In some embodiments, the cycloalkene monomer is cyclooctene. In some embodiments, the copolymer has a morphology selected from the group consisting of cylindrical, lamellar, double diamond, and gyroid. In some embodiments, the copolymer has a morphology selected from the group consisting of spherical, cylindrical, and lamellar.

The present invention also provides a method to selectively separate an alcohol from an aqueous mixture, the method comprising:

(a) providing a membrane comprising a copolymer composition comprising a block of polymerized cycloalkene monomer and two end groups, the end groups selected from the group consisting of polydialkylsiloxane, poly(alkylacrylate), poly(alkylmethacrylate), and poly(propylene oxide); and (b) contacting the aqueous mixture with the membrane whereby the alcohol selectively permeates through the membrane by pervaporation or vapor permeation to selectively separate the alcohol from the aqueous mixture. In some embodiments, the membrane comprises a copolymer composition having a morphology selected from the group consisting of lamellar, cylindrical, double diamond, and gyroid. In some embodiments, the membrane comprises a copolymer composition having a morphology selected from the group consisting of lamellar and cylindrical. In some embodiments, the membrane has a separation factor ($M_{SF}$) of 1.0 to 3.0. In some embodiments, the membrane has a domain spacing of 15-75 nm. In some embodiments, the membrane has a flux of 50-70 g/m$^2$-h. In some embodiments, the alcohol selectivity is at least 10. In some embodiments, the alcohol is ethanol or butanol. In some embodiments, the alcohol is ethanol.

The present invention further provides a method of selectively separating an alcohol from an aqueous mixture, the method comprising:

(a) providing a membrane comprising an SBS copolymer composition; and (b) contacting the aqueous mixture with the alcohol-selective membrane whereby the alcohol selectively passes through the membrane by pervaporation or vapor permeation to selectively transport the alcohol from the aqueous mixture. In some embodiments, the membrane comprises a copolymer composition having a morphology selected from the group consisting of spherical, lamellar, and cylindrical. In some embodiments, the membrane comprises a copolymer composition having a cylindrical morphology. In some embodiments, the membrane has a flux and a domain spacing, and wherein the flux increases as the domain spacing increases. In some embodiments, the membrane has a separation factor ($M_{SF}$) of 1.0 to 3.0. In some embodiments, the membrane has a domain spacing of 15-75 nm. In some embodiments, the membrane has a flux of 10-70 g/m²-h. In some embodiments, the alcohol selectivity is at least 10. In some embodiments, the alcohol is ethanol or butanol. In some embodiments, the alcohol is ethanol.

The invention further provides a copolymer of a first cycloalkene monomer and a second cycloalkene monomer, wherein the second cycloalkene monomer is substituted with one or more polydialkylsiloxane groups. In some embodiments, the polydialkylsiloxane groups comprise between 20-60 wt % of the copolymer. In some embodiments, the polydialkylsiloxane groups comprise between 35-45 wt % of the copolymer. In some embodiments, the polydialkylsiloxane is polydimethylsiloxane. In some embodiments, the first cycloalkene monomer is an optionally substituted ring selected from the group consisting of cyclopentene, cyclohexene, cycloheptene, cyclooctene, cyclononene, cyclodecene, norbornene, and cyclooctadiene. In some embodiments, the first cycloalkene monomer is optionally substituted cyclooctene. In some embodiments, a molar ratio of the first cycloalkene monomer and the second cycloalkene monomer in the copolymer is 5-30. In some embodiments, the molar ratio of the first cycloalkene monomer and the second cycloalkene monomer in the copolymer is 10-20. In some embodiments, the second cycloalkene monomer is a norbornene substituted with one or more PDMS groups and optionally further substituted. In some embodiments, the second cycloalkene monomer is 2-polydimethylsiloxyl-5-norbornene. In some embodiments, the copolymer is a graft copolymer. In some embodiments, the copolymer is unsaturated. In some embodiments, the copolymer is saturated. In some embodiments, the copolymer has a morphology selected from the group consisting of lamellar, cylindrical, double diamond, and gyroid. In some embodiments, the copolymer has a domain size of 15-75 nm.

The invention further provides a composition comprising a ring-opening, olefin metathesis polymerization catalyst and the first cycloalkene monomer and second cycloalkene monomer, wherein the second cycloalkene monomer is substituted with one or more polydialkylsiloxane groups.

The invention further provides a method of synthesizing a copolymer composition comprising reacting the first cycloalkene monomer and second cycloalkene monomer with a ring-opening, olefin metathesis polymerization catalyst, wherein the second cycloalkene monomer is substituted with one or more polydialkylsiloxane groups.

The invention further provides a method of selectively separating an alcohol from an aqueous mixture, the method comprising:

(a) providing a membrane comprising a copolymer of a first cycloalkene monomer and a second cycloalkene monomer, wherein the second cycloalkene monomer is substituted with one or more polydialkylsiloxane groups; and (b) contacting the aqueous mixture with the membrane whereby the alcohol selectively permeates through the membrane by pervaporation or vapor permeation to selectively separate the alcohol from the aqueous mixture. In some embodiments, the membrane comprises a copolymer composition having a morphology selected from the group consisting of lamellar, cylindrical, double diamond, and gyroid. In some embodiments, the membrane comprises a copolymer composition having a morphology selected from the group consisting of lamellar and cylindrical. In some embodiments, the membrane has a separation factor ($M_{SF}$) of 1.0 to 3.0. In some embodiments, the membrane has a domain spacing of 15-75 nm. In some embodiments, the membrane has a flux of 50-70 g/m²-h. In some embodiments, the alcohol selectivity is at least 10. In some embodiments, the alcohol is ethanol or butanol. In some embodiments, the alcohol is ethanol.

DESCRIPTION OF DRAWING FIGURES

FIG. 1. Ethanol pervaporation on PCOE-g-PDMS membranes at 43° C. Feed concentration is 8.0±0.1 wt %. FIGS. (a), (b), and (c) are for samples PCOE-g-PDMS_1, PCOE-g-PDMS_2, and PCOE-g-PDMS_3, respectively, as described in Example 2.

FIG. 2. Ethanol pervaporation of PCOE-g-PDMS_2 at different temperatures, as described in Example 2. Each measurement was taken when the membrane reached equilibrium after 8 h; feed ethanol concentration 8.1±0.1 wt %.

FIG. 3. Small angle x-ray scattering data for exemplary SBS polymers described in Example 5. The SBS samples SBS34, SBS62, SBS153, and SBS257 have a domain spacing of 19.4 nm, 29.6 nm, 37 nm, and 55 nm, respectively.

FIG. 4. Membrane separation factor increases with increasing domain spacing and plateaus at a domain spacing ~55 nm for exemplary SBS polymers described in Example 5. Varying the domain size increases the alcohol permeability relative to water permeability through the membrane. The membrane separation factor also increases with increasing temperature for higher MW (larger domain spacing) membranes.

FIG. 5. Overall flux increases with increasing domain spacing and plateaus at a domain spacing of ~55 nm for exemplary SBS polymers described in Example 5. The membrane thickness is ~50 μm FIG. 6. Composition ratio as a function of polymer volume fraction for poly(isoprene-2-vinylpyridine) (1-2VP) and polystyrene-polybutadiene-polystyrene (SBS) polymer samples as described in Example 5.

FIG. 7. Gel permeation chromatograms of polystyrene-polybutadiene-polystyrene (SBS) polymer samples as described in Example 5.

FIG. 8. Transmission Electron Microscopy (TEM) micrographs showing dry state morphology of polymer membranes, 8(a) SBS1 membrane with lamellar morphology; 8(b) SBS4 membrane with cylindrical morphology.

FIG. 9. Alcohol pervaporation results and rheological characterization for an exemplary SBS polymer sample having spherical (bcc) morphology as described in Example 6 (Table 7).

FIG. 10. Alcohol pervaporation results and rheological characterization data for an exemplary SBS polymer sample having cylindrical morphology (polystyrene volume %=0.26) as described in Example 6 (Table 7).

FIG. 11. Alcohol pervaporation results and rheological characterization data for an exemplary SBS polymer sample having lamellar morphology (polystyrene volume %=0.39) as described in Example 6 (Table 7).

FIG. 12. SAXS and TEM data for two different exemplary SBS polymer samples with different domain spacings for both lamellar and cylindrical morphologies as described in Example 7. The domain spacings for the cylindrical morphology are 34.9 nm and 39.1 nm. The domain spacings for the lamellar morphology are 35.5 and 45.9 nm.

FIG. 13. Flux and $M_{SF}$ for membranes prepared from exemplary SBS polymer samples having cylindrical morphology and two different domain spacings as described in Example 7.

FIG. 14. Flux and $M_{SF}$ for membranes prepared from exemplary SBS polymer samples having lamellar morphology and two different domain spacings as described in Example 7.

FIG. 15. $^1$H NMR spectrum of the permeate sample containing 40.14 wt % ethanol in the permeate using a SBS membrane as described in Example 8.

FIG. 16. Alcohol pervaporation results for membranes composed of SBS polymer samples having spherical (bcc) morphology and two different domain spacings as described in Example 9 (50 μm membranes). FIG. 16a shows flux vs. domain spacing, and FIG. 16b shows $M_{SF}$ vs. domain spacing. Both flux and $M_{SF}$ increase as the domain spacing is increased from 37.9 nm to 51.2 nm.

FIG. 17. Alcohol pervaporation results for membranes composed of SBS polymer samples having cylindrical morphology and two different domain spacings as described in Example 9 (50 μm membranes; $\Phi_{PS}$=0.26).

FIG. 18. Alcohol pervaporation results for membranes composed of SBS polymer samples having lamellar morphology and two different domain spacings as described in Example 9 ($\Phi_{PS}$=0.37±0.02).

DETAILED DESCRIPTION

The following description sets forth exemplary methods, parameters and the like. It should be recognized, however, that such description is not intended as a limitation on the scope of the present proposed invention but is instead provided as a description of exemplary embodiments.

1. Definitions

As used herein, the term "alkyl" includes straight-chain, branched-chain, and cyclic monovalent hydrocarbyl radicals, and combinations of these. Examples include methyl, ethyl, isobutyl, cyclohexyl, cyclopentylethyl, and the like.

As used herein, the term "cycloalkene" includes a carbocyclic non-aromatic ring comprising at least one alkene bond. The cycloalkene may be a monocyclic ring or a bridged bicyclic ring. Non-limited examples include optionally substituted cyclopentene, cyclohexene, cycloheptene, cyclooctene, cyclononene, cyclodecene, norbornene, and cyclooctadiene.

As used herein, the term "polydialkylsiloxane" includes polymers comprising a dialkylsiloxane monomer, which may be prepared from, for example, anionic polymerization of a hexaalkylcyclotrisiloxane such as hexamethylcyclotrisiloxane. In some embodiments, the Mn of the polydialkylsiloxane polymers is typically between 1-100 kg mol$^{-1}$ as measured by Size Exclusion Chromatography (SEC). The polydialkylsiloxane polymers described herein may be incorporated into the side-chains of graft copolymers or onto the ends of block copolymers such as, for example, triblock copolymers. In some embodiments, the graft copolymers with PDMS side-chains have a Mn between about 20-200 kg mol$^{-1}$, PDI between about 1-3, and about 20-60 or 35-45 wt % PDMS. In some embodiments, the triblock copolymers with PDMS end groups have a Mn between about 20-200 kg mol$^{-1}$, PDI between about 1-3, and about 20-60 wt % or 35-45 PDMS.

As used herein, the term "graft copolymer" includes polymers which are synthesized from more than one monomer and have side chains that are structurally distinct from the main chain. Examples include copolymers synthesized from two cycloalkene monomers, where at least one of the cycloalkene monomers is substituted with at least one polydialkylsiloxane polymer groups. In the resulting copolymer, the main chain includes the two copolymerized, ring-opened cycloalkene monomers and the side chains include the polydialkylsiloxane polymer groups.

As used herein, the term "block copolymer" includes polymers that comprise at least two blocks, where each block contains a different polymerized monomer composition than the other block or blocks. Examples include diblock, triblock, tetrablock, and multiblock copolymers. The triblock block copolymers described herein may contain, for example a linear middle block of a first monomer composition with end blocks of a second monomer composition.

As used herein, the term "ring-opening, olefin metathesis polymerization" abbreviated "ROMP" includes a reaction whereby a cyclic olefin monomer is polymerized or copolymerized by ring-opening of the cyclic olefin monomer. Typically, a transition metal catalyst containing a carbene ligand mediates the metathesis reaction. Said ROMP reactions are well known to those skilled in the art.

As used herein, the term "lamellar morphology" includes a phase domain morphology having layers of alternating compositions that generally are oriented parallel with respect to one another. In some embodiments, the domain size is 15-75 nm. In some embodiments, the morphologies are bicontinuous. The term "lamellar morphology" also includes perforated lamellae.

As used herein, the term "cylindrical morphology" includes a phase domain morphology having discrete tubular or cylindrical shapes. The tubular or cylindrical shapes may be hexagonally packed on a hexagonal lattice. In some embodiments, the domain size is 15-75 nm. In some embodiments, the morphologies are bicontinuous.

As used herein, the term "gyroid morphology" includes a phase domain morphology having a network structure with triply connected junctions. In some embodiments, the domain size is 15-75 nm. In some embodiments, the morphologies are bicontinuous.

As used herein, the term "double diamond morphology" includes a phase domain morphology having a double-diamond symmetry of space group Pn3m. In some embodiments, the domain size is 15-75 nm. In some embodiments, the morphologies are bicontinuous.

As used herein, the terms "spherical morphology" or "bcc morphology" are used interchangeably and refer to a phase domain morphology having spherical domains of one block arranged on a body centered cubic lattice in a matrix of the second block. In some embodiments, the spherical domains are comprised of polystyrene. In some embodiments, the second block is polybutadiene.

As used herein, the term "(meth)acrylate" includes both acrylate and methacrylate.

As used herein, the term "butanol" includes all structural isomers of butanol such as isobutanol and n-butanol.

As used herein, the term "aqueous mixture" includes a mixture of components where at least one of the components is water. The "aqueous mixture" may be in the liquid or gas phase. In some embodiments, the aqueous mixture of interest is produced by a fermentation process.

As used herein, the terms "polystyrene-polybutadiene-polystyrene copolymers," "styrene-butadiene-styrene copolymers," and "SBS" may be used interchangeably and refer to triblock copolymers comprising three segments or sections: a polybutadiene middle section and polystyrene end sections flanking the middle section.

As used herein, the term "optionally substituted" indicates that the particular group or groups being described may have no non-hydrogen substituents, or the group or groups may have one or more non-hydrogen substituents. If not otherwise specified, the total number of such substituents that may be present is equal to the number of H atoms present on the unsubstituted form of the group being described. Typically, 0-4 such substituents are present, and in some substituted embodiments, 1-2 substituents are present. The substituents are independently selected from the group consisting of C1-C6 alkyl, aryl, OR, halo, $CO_2R$, $CONR_2$, and CN, where R=C1-C6 alkyl or H. Where an optional substituent is attached via a double bond, such as a carbonyl oxygen (=O), the group takes up two available valences, so the total number of substituents that may be included is reduced according to the number of available valences.

As used herein, the term "alkyl" includes straight-chain, branched-chain, and cyclic monovalent hydrocarbyl radicals, and combinations of these. Examples include methyl, ethyl, isobutyl, cyclohexyl, cyclopentylethyl, and the like.

As used herein, the term "aryl" includes polyunsaturated, typically aromatic hydrocarbon substituents, such as phenyl.

As used herein, the term "halo" includes fluoro, chloro, bromo, and iodo.

2. Description of the Invention

The present invention relates to copolymer compositions for alcohol-selective membranes and methods of selectively separating an alcohol from an aqueous solution using such membranes. The copolymer compositions may be block copolymers such as polystyrene-polybutadiene-polystyrene (hereafter "SBS") triblock copolymers. In some preferred embodiments, the copolymer compositions are hydrophobic to hinder the permeation of water molecules. The copolymer compositions may contain a structural block that imparts essential mechanical properties to the membrane (e.g., polystyrene or polyvinylcyclohexane) and may also contain an alcohol transporting block (e.g., polydimethylsiloxane or polybutadiene). The structural block may be glassy such as polystyrene, cross-linked such as radiation cross-linked polyethylene, or crystalline such as polyvinylidene fluoride.

Other classes of copolymer compositions may be used for alcohol-selective membranes including copolymers synthesized from a first cycloalkene monomer and a second cycloalkene monomer, wherein the second alkene monomer is substituted with one or more polydialkylsiloxane groups. The copolymer compositions may be graft copolymers, where the main chain is a copolymer synthesized by ring opening metathesis polymerization of two cycloalkene monomers and the pendant chains are polydialkylsiloxane groups. The pendant chain polydialkylsiloxane groups may be synthesized by ring opening, anionic polymerization of a cyclic trisiloxane to form polydialkylsiloxane polymers. These polydialkylsiloxane polymers may be end-capped with a cycloalkene monomer group to form the second cycloalkene monomer substituted with one or more polydialkylsiloxane groups. The first cycloalkene monomer is then reacted with the second cycloalkene monomer substituted with one or more polydialkylsiloxane groups in a ring-opening metathesis polymerization reaction to form embodiments of the graft copolymers which may be used for the alcohol-selective membranes described herein.

In some embodiments, the first cycloalkene monomer is selected from the group consisting of cyclopentene, cyclohexene, cycloheptene, cyclooctene, cyclononene, cyclodecene, norbornene, and cyclooctadiene, each of which can be optionally substituted. In some preferred embodiments, the first cycloalkene monomer is an optionally substituted cyclooctadiene. In some embodiments the second cycloalkene monomer is a norbornene or cyclooctene that is substituted with one or more polydialkylsiloxane groups and may optionally be further substituted. In some preferred embodiments, the second cycloalkene monomer is 2-polydimethylsiloxyl-5-norbornene. The second cycloalkene monomer may be referred to in the literature as a "macromonomer," as it has a relatively long PDMS chain attached to it.

In some embodiments, the first cycloalkene monomer is an optionally substituted norbornene and the second cycloalkene monomer in an optionally substituted norbornene that is substituted with one or more polydialkylsiloxane groups.

In some embodiments, the molar ratio of the first cycloalkene monomer and the second cycloalkene monomer in the copolymer is between 5 and 30. In other embodiments, the molar ratio of the first cycloalkene monomer and the second cycloalkene monomer is between 10 and 20. In some embodiments, the copolymer is unsaturated or saturated. In some embodiments, the polycycloalkene backbone may be further hydrogenated to produce saturated graft copolymers.

Another exemplary class of copolymer compositions that may be used in the alcohol-selective membranes described herein includes copolymers comprising a middle section formed from a cycloalkene monomer. These copolymers may be triblock copolymers. The middle section of the triblock may be flanked with two end groups having a different polymeric composition, the end groups comprising a polymer selected from the group consisting of polydialkylsiloxane, poly(alkylacrylate), poly(alkylmethacrylate), and poly(propylene oxide). In some embodiments, the polydialkylsiloxane is polydimethylsiloxane (PDMS). In other embodiments, the poly(alkylmethacrylate) is poly(n-butylmethacrylate). In some embodiments, the poly(propylene oxide) end groups are (meth)acrylate-terminated.

In some preferred embodiments, the triblock copolymers contain polydialkylsiloxane-containing end groups flanking a polycycloalkene middle section. The middle section may be synthesized by ring-opening metathesis polymerization (ROMP) of a cycloalkene monomer such as cyclooctene in the presence of a chain transfer agent (e.g., 1,2-bis(bromoisobutyryloxy)-2-butene) to yield Br-polycycloalkene-Br. A subsequent atom transfer radical polymerization (ATRP) of Br-polycycloalkene-Br with a methacrylate-terminated polydialkylsiloxane produces a polydialkylsiloxane-polycycloalkene-polydialkylsiloxane triblock copolymer that may be used as an alcohol-selective membrane material. In some embodiments, the middle block is formed from a cycloalkene monomer selected from the group consisting of cyclopentene, cyclohexene, cycloheptene, cyclooctene, cyclononene, cyclodecene, cyclooctadiene, and norbornene. In some preferred embodiments, the middle block is formed from polycyclooctene or polynorbornene and the end blocks comprise polydimethylsiloxane, poly(n-butyl methacrylate), or methacrylate-terminated poly(propylene oxide) (PPO-MA).

In some embodiments, the synthesized copolymer compositions have a morphology that is selected from the group consisting of cylindrical, lamellar, double diamond, and gyroid. In other embodiments, SBS copolymer compositions having a cylindrical morphology may be selected as a membrane material.

In some embodiments, the synthesized copolymer compositions have a morphology that is selected from the group consisting of spherical, cylindrical, and lamellar. In other embodiments, the synthesized copolymer compositions have a morphology that is cylindrical or lamellar. In other embodiments, the synthesized copolymer compositions have a morphology that is lamellar. In other embodiments, the synthesized copolymer compositions have a morphology that is cylindrical. The synthesized copolymer compositions having a spherical, cylindrical, or lamellar morphology may be selected as the membrane material for selective alcohol transport. In some embodiments, synthesized copolymer compositions having a lamellar or cylindrical morphology may be selected as the membrane material. In other embodiments, synthesized copolymer compositions having a lamellar morphology may be selected as the membrane material. In other embodiments, synthesized copolymer compositions having cylindrical morphology may be selected as the membrane material.

SBS copolymer compositions having a spherical, cylindrical, or lamellar morphology may be selected as the membrane material for selective alcohol transport. In some embodiments, SBS copolymer compositions having a spherical or cylindrical morphology may be selected as the membrane material. In other embodiments, SBS copolymer compositions having a spherical morphology may be selected as a membrane material. In other preferred embodiments, SBS copolymer compositions having a cylindrical morphology may be selected as a membrane material.

The invention further provides a membrane comprising the copolymer compositions described herein. In some embodiments, the membrane has a thickness between 20-150 µm. In some embodiments, the membrane has a thickness between 20-50 µm. In some embodiments, the membranes may be supported on a support material, for example, a porous support material such as porous ceramic. Other membrane supports are well-known in the art. Supported membranes may have smaller thicknesses than the unsupported membranes between 1-20 µm. In some embodiments, the supported membranes may have a thickness between 1-5 µm. Thickness, as used herein, refers to the average thickness of 20-50 measurement points over the entire membrane area. Other methods of determining average thickness of a membrane are well-known in the art. The membranes may be cast by slow evaporation of solutions of the copolymer compositions described herein.

The invention further provides a method of selectively separating an alcohol from an aqueous mixture, the method comprising:

(a) providing the membrane of any of the copolymer compositions described herein; and (b) contacting the aqueous mixture with the membrane by pervaporation or vapor permeation to selectively separate the alcohol from the aqueous mixture, wherein the alcohol passes through the membrane for collection.

The invention further provides a method of selectively separating an alcohol from an aqueous mixture, the method comprising:

(a) contacting an alcohol-selective membrane comprising a copolymer composition having a morphology selected from the group consisting of lamellar, cylindrical, double diamond, and gyroid; and (b) contacting the aqueous mixture with the alcohol-selective membrane whereby the alcohol passes through the membrane by pervaporation or vapor permeation to selectively transport the alcohol from the aqueous mixture through the membrane. In some preferred embodiments, the alcohol-selective membrane comprises an SBS copolymer composition having a cylindrical morphology.

In some embodiments, the alcohol selectivity is at least 5. In some embodiments, the alcohol selectivity is at least 10.

In some embodiments, the membrane has a flux and a domain spacing, and the flux increases and the domain spacing increases.

In some embodiments, the alcohol is ethanol or butanol. In some embodiments, the alcohol is ethanol. In some embodiments, the membrane has a separation factor ($M_{SF}$) of 1.0 to 3.0. In some embodiments, the membrane has a domain spacing of 15-75 nm. In some embodiments, the membrane has a flux of 10-70 g/m²·h. In some embodiments, the membrane has a flux of 50-70 g/m²·h.

EXAMPLES

The following examples are offered to illustrate but not to limit the invention.

Materials

Polystyrene-polybutadiene-polystyrene samples SBS1, SBS2 and SBS3 were obtained from Sigma Aldrich. Samples SBS4, SBS34, SBS62, SBS153, SBS257, and I-2VP were synthesized using standard sequential anionic polymerization techniques. Kraton-1101 and Kraton-1192 samples were supplied by Kraton Polymers LLC. Polycyclooctene (PCOE)-Polydimethylsiloxane (PDMS) Graft Copolymers (PCOE-graft-PDMS) where the backbone is PCOE and the pendant chains are PDMS were synthesized as described below. Triblock copolymers containing methacrylate-terminated PDMS (PDMS-MA) end blocks and a PCOE middle section were synthesized as described below.

Hexamethylcyclotrisiloxane was purchased from Aldrich. Norbornenylethyldimethylchlorosilane was purchased from Hybrid plastics. Methacrylate-terminated PDMS (PDMS-MA) is commercially available from Gelest Inc.

Membrane Casting

A predetermined amount of polymer was dissolved in toluene to make a 5-wt % solution. This solution was poured into a Teflon Petri dish kept on a level surface. The Petri dish was covered with aluminum foil to facilitate slow evaporation of the solvent overnight at room temperature. Membranes were peeled off the Teflon surface and cut into 75 mm diameter circles for pervaporation experiments.

Sorption Measurements

Dry strips of membranes weighing at least 0.4 grams were submerged in pure water, ethanol, 1-butanol, and respective feed solutions in closed vials at room temperature. After 24 hours of equilibration, strips were taken out of the vials, and quickly weighed after gently wiping their surface to get rid of excess liquid. This process was repeated to make sure there was no further weight increase. Membrane uptake was calculated using the equation, $$\% \text{ sorption} = \frac{W_s - W_d}{W_d}, \quad (1)$$

where $W_s$ is the mass of swollen membrane and $W_d$ is the mass of the dry membrane.

Gel Permeation Chromatography (GPC)

Polymer samples were characterized to quantify their relative molecular weight distributions on a GPC column (Viscotek TDAmax system) at a flow rate of 1 ml/min and THF as solvent.

NMR Spectroscopy $^1$H NMR experiments were carried out on a Bruker AVQ-400 spectrometer at 400 MHz to characterize the compositions of polymers as well as the compositions of feed and permeate alcohol-water mixture from pervaporation experiments.

Transmission Electron Microscopy (TEM)

Polymer membrane samples were cryo-microtomed at −140° C. to obtain thin sections with thicknesses in the 50-80 nm range using an RMC Boeckeler PT XL ultramicrotome. The electron contrast in the polymer samples was enhanced by exposure to osmium tetraoxide ($OsO_4$) for 2 hours. Imaging of stained samples was performed on a Zeiss LIBRA 200FE microscope operating at 200 kV. Images were recorded on a Gatan 2048×2048 pixel CCD camera (Gatan Inc., Pleasanton, Calif.). All data sets were acquired using Digital Micrograph (Gatan, Inc.) software. The TEM images were used to determine and quantify the morphology of our copolymers in dry state (FIG. 8).

Pervaporation Experiments

Pervaporation experiments were conducted on a laboratory bench test unit by Sulzer Chemtech GmbH. The membrane was held inside a circular cell restrained with an o-ring, providing a total permeation area of 37 cm$^2$. 2 liters of an 8 wt % ethanol-water liquid solution was fed into the feed tank. The temperature of the feed mixture was controlled in the range of 30° C. to 60° C. using a temperature controller equipped with a single stage rotary vane pump for re-circulation of ethylene glycol. The temperature of the liquid was also monitored at the inlet and outlet of the pervaporation cell with separate thermocouples during the experiment. After starting the feed pump, the system was allowed to attain steady state for ~3 hours before starting to collect permeate samples. On the permeate side of the membrane, a vacuum of ~9 or ~2 mbar was applied using a vacuum pump and permeates were condensed in a trap cooled with a dry ice/iso-propanol mixture at ~−70° C.

Flux, Process Separation Factor and Permeability Calculations

To measure the flux, both the feed and the permeate samples were collected. Permeate sample was weighed on a Mettler Toledo AB 204-S balance to obtain the mass measurement. Both the feed and the permeate samples were analyzed using NMR to determine their compositions. Feed composition was taken to be the average of the compositions at the beginning and the end of permeate collection. Flux was evaluated using the equation, $$J_i = \frac{M_i}{A\Delta t}, \quad (2)$$

where $M_i$ is the mass of individual permeant, A is the permeation area and $\Delta t$ is the permeate collection time. The process separation factor α is calculated using the equation, $$\alpha = \frac{y/1-y}{x/1-x}, \quad (3)$$

where y and x are the weight fractions of alcohol in the permeate and the feed, respectively. For the calculation of membrane permeability, the following transport equation for pervaporation from solution-diffusion model was used (refs. 1-2).

$$I_i = \frac{P_i}{l(x_i \gamma_i p_i^{sat} - y_i p_p)}, \quad (4)$$

where $P_i$ is the membrane permeability, l is the membrane thickness, $x_i$ is the feed mole fraction, 1 is the activity coefficient, $p_i^{sat}$ is the saturated vapor pressure, $y_i$ is the permeate mole fraction and $p_p$ is the permeate pressure. The activity coefficients were calculated using the Van Laar equation. Saturated vapor pressure $p_i^{sat}$ was determined using the Antoine equation. Also, the membrane separation factor was determined as, $$\beta = \frac{P_1}{P_2}, \quad (5)$$

where $P_1$ and $P_2$ are permeabilities of alcohol and water respectively.

Example 1

Synthesis of Polycyclooctene (PCOE)-Polydimethylsiloxane (PDMS) Graft Copolymers PCOE-PDMS graft copolymers (PCOE-graft-PDMS) where the backbone is PCOE and the pendant chains are PDMS have been synthesized as an alcohol-selective membrane material. PCOE-graft-PDMS may be synthesized through a combination of ring opening polymerization and ring opening metathesis polymerization reactions. The number of PDMS chains and the PDMS chain length are readily tuned by manipulation of the reaction stoichiometry. The resultant copolymers may be cast into membranes of desired thickness. PDMS-X, where the X group is reactive to a metathesis catalyst, was synthesized via anionic polymerization of hexamethylcyclotrisiloxane followed by an end capping reaction. An exemplary synthesis of norbornene substituted with at least one dialkylsiloxane group is shown in Scheme 1. The PDMS anions were capped with norbornenylethyldimethylchlorosilane.

Scheme 1. Synthetic protocol for PCOE-graft-PDMS.

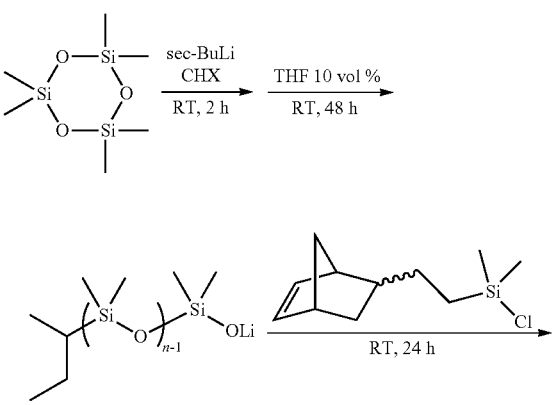

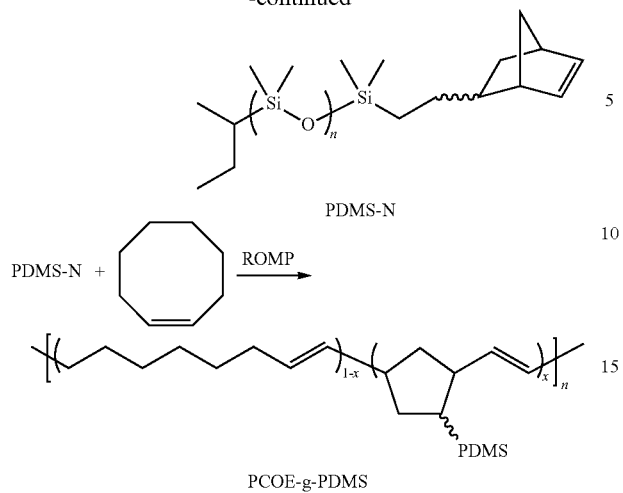

PDMS-N

PCOE-g-PDMS

Three PDMS-N polymers of varied molecular weight are summarized in Table 1. The number average molecular weight ($M_n$) based on polystyrene standards and polydispersity index (PDI) were determined by size exclusion chromatography. The actual $M_n$ was determined by NMR end group analysis.

TABLE 1

Summary of PDMS-N polymers

| Sample | $M_n$ (theo) kg mol$^{-1}$ | SEC $M_n$ (kg mol$^{-1}$) | PDI | $M_n$ (NMR) kg mol$^{-1}$ |
|---|---|---|---|---|
| PDMS-N_1 | 1.0 | 0.69 | 1.38 | 1.2 |
| PDMS-N_2 | 2.0 | 1.65 | 1.27 | 2.4 |
| PDMS-N_3 | 3.8 | 2.86 | 1.37 | 4.7 |

Next, ring opening metathesis copolymerization of a cyclic monomer (e.g., cyclooctene) and PDMS-N was carried out (see Scheme 1), producing PCOE-g-PDMS copolymers in yields greater than 90%. Three PCOE-g-PDMS samples were summarized in Table 2.

TABLE 2

Summary of PCOE-g-PDMS copolymers.

| Sample | $M_n$ (theo) kg mol$^{-1}$ | COE:PDMSN mol ratio Feed | COE:PDMSN mol ratio Polymer | PDMS wt % | SEC $M_n$ | PDI |
|---|---|---|---|---|---|---|
| PCOE-g-PDMS_1 | 86 | 16 | 17 | 39.7 | 69.0 | 1.38 |
| PCOE-g-PDMS_2 | 96 | 33 | 32 | 40.4 | 97.5 | 1.53 |
| PCOE-g-PDMS_3 | 86 | 64 | 55 | 43.0 | 73.0 | 1.51 |

Theoretical $M_n$ values were estimated based on the reaction stoichiometry assuming quantitative conversion of the monomers. The PDMS composition in the resulting graft copolymer was obtained by NMR analysis. Size Exclusion Chromatograph (SEC) analysis of these copolymers showed relatively narrow PDIs. Morphological characterization of these membranes may be carried out by small angle x-ray scattering (SAXS) and transmission electron microscopy (TEM). In these membranes, the PDMS compositions are roughly 40 wt %, while the length and density of the PDMS chains may be varied accordingly.

Example 2

Selective Alcohol Separation from Aqueous Solution Using Polycyclooctene (PCOE)-Polydimethylsiloxane (PDMS) Graft Copolymers as the Membrane Material Ethanol/water pervaporation experiments were conducted on membranes made from PCOE-PDMS graft copolymers. The feed aqueous solution contained approximately 8 wt % ethanol, and ethanol concentrations in permeates were analyzed by NMR experiments. The process separation factor α and total flux were plotted against permeation time (FIGS. 1a-1c). At 43° C., for each membrane, an equilibrium state was reached after roughly 6 hours. As the length of PDMS chains increased, ethanol selectivity increased accordingly and remained constant when the $M_n$ value of the PDMS chains reached 2.4 kg mol$^{-1}$. PCOE-g-PDMS_2 was measured at 43° C. continuously for one week, and no decay in selectivity or flux was observed. At 43° C., PCOE-g-PDMS_2 exhibited high ethanol selectivity (>18) in the first 6 h, while this phenomenon was not observed in the other two membranes. DSC analysis of PCOE-g-PDMS_2 indicated that the semicrystalline PCOE phase of PCOE-g-PDMS_2 had a higher percentage of crystallinity than the other two samples, which might be related with this unusual result.

Pervaporation experiments on PCOE-g-PDMS_2 were also performed at different temperatures. The ethanol selectivity remained constant, while the overall flux increased with temperature (FIG. 2). Overall, ethanol selectivity of these membranes is slightly higher than crosslinked PDMS membranes, but these membranes may be casted into a thickness of less than 10 μm to gain higher flux. Thus, these membranes may potentially outperform standard PDMS membranes. Butanol pervaporation experiments on PCOE-g-PDMS_2 have been conducted, showing similar results to crosslinked PDMS membranes in literature.

Example 3

Synthesis of Polycyclooctene (PCOE)-Polydimethylsiloxane (PDMS) Triblock Copolymers (Also Referred to as "DCD" Copolymers Herein)

Triblock copolymers containing PDMS and PCOE have been prepared. 1,2-bis (bromoisobutyryloxy)-2-butene was prepared as described in literature (ref. 3). PDMS-Y, where Y is a functional group, may be polymerized with radical initiators. Herein, methacrylate-terminated PDMS (PDMS-MA) is commercially available. Ring opening metathesis polymerization of a cyclic monomer like COE in the presence of a chain transfer agent (1,2-bis (bromoisobutyryloxy)-2-butene) yielded telechelic polycyclooctene (Br—PCOE-Br). In a subsequent atom transfer radical polymerization (ATRP) of PDMA-MA using Br—PCOE-Br as a macro-initiator, a triblock copolymer containing two P(PDMS-MA) end blocks was produced (Scheme 2). Unlike most linear triblock copolymers, the middle block is linear while the end blocks are PDMS brushes.

Scheme 2. Synthetic scheme of P(PDMS-MA)-b-PCOE-b-P(PDMS-MA) (also referred to as "DCD" copolymers herin)

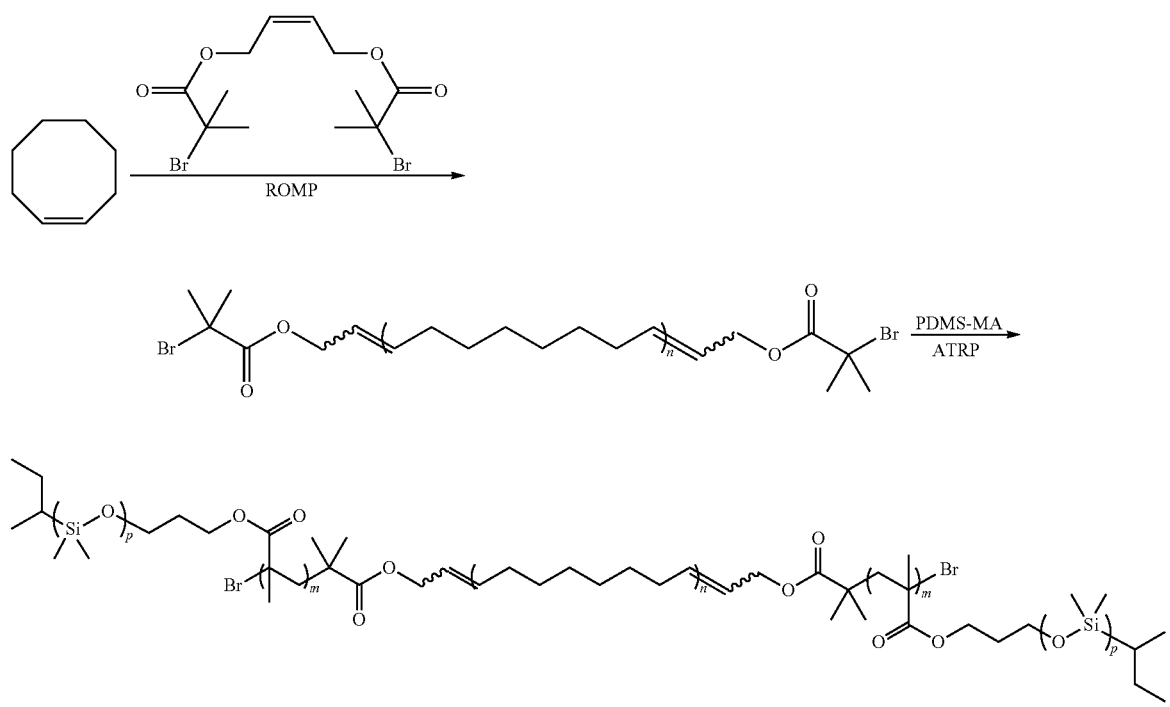

A series of PCOEBr (6-50 kg mol$^{-1}$) have been synthesized and utilized to produce P(PDMS-MA)-PCOE-P(PDMS-MA) copolymers (Table 3). With fixed P(PDMS-MA) composition, triblock copolymers of different molecular weight were produced, where the PDMS domain size was finely tuned. Additionally, by using one Br—PCOE-Br sample (24 kg ma$^i$), the PDMS composition was adjusted to access diverse morphologies such as cylinders and lamellae, where the shape of PDMS domains was varied.

These triblock copolymers may be modified such that the middle block comprises a polynorbornene composition and the end blocks may be replaced by other alcohol-selective polymer compositions, such as poly(n-butyl methacrylate) (PBuMA) and methacrylate-terminated poly(propylene oxide) (PPO-MA).

Example 4

Selective Alcohol Separation from Aqueous Solution Using Polycyclooctene (PCOE)-Polydimethylsiloxane (PDMS) Triblock Copolymers as the Membrane Material (Also Referred to as "DCD" Copolymers Herein)

Ethanol/water pervaporation experiments were conducted on membranes made from PCOE-PDMS triblock copolymers. The feed aqueous solution contains approximately 8 wt % ethanol, and ethanol concentrations in permeates were analyzed by NMR experiments. The process separation factor α and total flux were plotted against permeation time.

TABLE 3

Summary of PDMS-PCOE-PDMS triblock copolymers (also referred to as "DCD" copolymers herein)

| | NMR | PDMS-MA | SEC | | SAXS | |
|---|---|---|---|---|---|---|
| | $M_n$ (kg mol$^{-1}$) | (wt %) | $M_n$ (kg mol$^{-1}$) | PDI | Morphology | D (nm) |
| D 1 | 1.0 | 100 | 1.0 | 1.21 | — | — |
| C 6 | 6.1 | 0 | 9.9 | 2.08 | — | — |
| DCD 3-6-3 | 11.7 | 47.7 | 21.8 | 1.38 | L | 23.7 |
| C 13 | 12.9 | 0 | 29.6 | 1.48 | — | — |
| DCD 6-13-6 | 23.8 | 45.7 | 40.6 | 1.46 | L | 27.3 |
| C 24 | 24.0 | 0 | 49.0 | 1.63 | — | — |
| DCD 5-24-5 | 33.5 | 28.4 | 57.0 | 1.65 | L | 34.1 |
| DCD 12-24-12 | 47.3 | 49.3 | 65.2 | 1.41 | L | 41.0 |
| C 45 | 45.2 | 0 | 68.6 | 1.66 | — | — |
| DCD 9-45-9 | 63.8 | 29.2 | 75.8 | 1.61 | L | 52.8 |
| DCD 27-45-27 | 98.2 | 54.0 | 85.4 | 1.52 | L | 65.4 |

The $M_n$ values of SEC were based on polystyrene standards. Small Angle X-ray Scattering (SAXS) was used to characterize the morphology of the triblock copolymers. "L" denotes a lamellar morphology and "D" represents the domain spacing.

Example 5

Selective Alcohol Separation from Aqueous Solution Using Polystyrene-Polybutadiene-Polystyrene (SBS) Copolymers Having a Cylindrical Morphology as the Membrane Material A summary of the SBS polymer samples used in alcohol separation experiments is shown in Table 4. The composition of the constituent blocks in copolymers is shown as the percentage of isoprene or styrene in the samples, determined by $^1$H NMR. The result of pervaporation experiments is shown in Table 5. A feed solution of ~8 wt % ethanol in water was used in respective pervaporation experiments. The poly(isoprene-2-vinylpyridine) (1-2VP) membrane, despite the solubility of 2-vinylpyridine block in ethanol, shows water selectivity in pervaporation of an ethanol-water mixture. However, in contrast to the I-2VP membrane, all of the polystyrene-polybutadiene-polystyrene membranes (SBS1, SBS2, SBS3, SBS4, SBS34, SBS62, SBS153, SBS257, Kraton 1101, and Kraton 1192) show alcohol selectivity in pervaporation of an ethanol-water mixture.

TABLE 4

Summary of SBS polymer samples studied compared to poly(isoprene-2-vinylpyridine) (I-2VP)

| Polymer | MW(kg/mol) | wt % I or S | Polydispersity |
|---|---|---|---|
| I-2VP | 100 | 57 | 1.15 |
| SBS1 | 54 | 34.03 | n.a. |
| SBS2 | 47 | 24.63 | n.a. |
| SBS3 | 140 | 32.08 | n.a |
| SBS4 | 91 | 28.68 | 1.1 |
| Kraton 1101 | n.a. | 31.95 | n.a. |
| Kraton 1192 | n.a. | 30.84 | n.a. |
| SBS34 | 34.2 | 23.4 | 1.09 |
| SBS62 | 62.3 | 23.5 | 1.05 |
| SBS153 | 153.3 | 23.1 | 1.12 |
| SBS257 | 257.2 | 23.7 | 1.33 |

TABLE 5

Results of pervaporation experiments for various SBS membranes

| Membrane | I-2VP | SBS1 | SBS2 | SBS3 | SBS4 | Kraton 1101 | Kraton 1192 | PDMS |
|---|---|---|---|---|---|---|---|---|
| Thickness (μm) | 150 | 152 | 87 | 104 | 50 | 90 | 113.3 | 160 |
| Permeate pressure (mbar) | 9 | 9 | 9 | 9 | 9 | 9 | 9 | 9 |
| Feed Temperature (° C.) | 43 | 50 | 50 | 50 | 50 | 50 | 50 | 50 |
| Flux (gm/m$^2$-hr) | 8.2 | 6.93 | 18 | 17.8 | 41.6 | 15.8 | 12.63 | 79.47 |
| Feed (EtOH wt %) | 8.3 | 8.3 | 8.1 | 8.3 | 8.18 | 8.3 | 8.087 | 8.4 |
| Permeate (EtOH wt %) | 0.4 | 16.5 | 35.74 | 34.81 | 36.38 | 40.2 | 27.77 | 44.95 |
| $P_{EtOH}$ (g-m/m$^2$-hr atm) | 0.0002 | 0.004 | 0.0136 | 0.0153 | 0.0182 | 0.0137 | 0.0096 | 0.1362 |
| $P_{Water}$ (g-m/m$^2$-hr atm) | 0.0167 | 0.008 | 0.0091 | 0.0109 | 0.012 | 0.0077 | 0.0094 | 0.0631 |
| Membrane sep. factor, β | 0.01 | 0.5 | 1.49 | 1.4 | 1.52 | 1.78 | 1.02 | 2.16 |
| Process sep. factor, α | 0.04 | 2.18 | 6.31 | 5.9 | 6.42 | 7.43 | 4.37 | 8.9 |

These results are corroborated by analyzing the interaction between the polymer membrane and the binary alcohol-water mixture using the Flory-Huggins thermodynamics. This analysis is based on the equality of chemical potentials of liquid components in the binary liquid phase and the ternary membrane phase. The parameter of interest, known as composition ratio (CR), is represented by the following equation, $$\ln\left(\frac{\varphi_1}{\varphi_2}\right) - \ln\left(\frac{v_1}{v_2}\right) = \frac{(s-1)\ln\varphi_2}{v_2} - \chi_{12}(\varphi_2 - \varphi_1) - \chi_{12}(v_1 - v_2) - \varphi_3(\chi_{13} - s\chi_{23}) \quad (6)$$

where $CR = \dfrac{\varphi_1/\varphi_2}{v_1/v_2}$.

The volume fractions of alcohol, water and membrane in the ternary phase are $\phi_1$, $\phi_2$ and $\phi_3$ respectively; and the volume fractions of alcohol and water in the binary liquid phase are $v_1$, $v_2$ respectively. The ratio of molar volumes of alcohol and water is denoted by s, and $\chi_{12}$, $\chi_{13}$ and $\chi_{23}$ are the alcohol/water, alcohol/polymer and water/polymer interaction parameters respectively. A value of CR>1 indicates that the membrane is richer in alcohol than the liquid mixture and hence is selectively absorbing alcohol. Equation 6 may be solved for a set of values of $v_1$ and $\phi_3$ to obtain CR, provided the interaction parameters are known. Parameters $\chi_{13}$ and $\chi_{23}$ have been experimentally determined using membrane swelling measurements. The free energy change of membrane swelling, ΔG, may be divided into two parts, the free energy of mixing, $\Delta G_m$, and the elastic free energy, $\Delta G_{el}$. At swelling equilibrium, ΔG=0, thus, $$\Delta G = \Delta G_m + \Delta G_{el} \quad (7)$$

This may be written as, $$\ln(1 - v_p) + v_p + \chi v_p^2 + \frac{V}{M_c \bar{v}_p}\left(v_p^{\frac{1}{3}} - \frac{1}{2}v_p\right) = 0, \quad (8)$$

where V is the molar volume of penetrant molecule, $\bar{v}_p$ is the specific volume of the polymer, $v_p$ is the volume fraction of the polymer, and $M_c$ is the average molecular weight between crosslinks. The final term in the above equation is reported to have a very small contribution. Therefore, the interaction parameter may be evaluated as, $$\chi = -\frac{[\ln(1 - v_p) + v_p]}{v_p^2} \quad (9)$$

Table 6 summarizes the results of membrane swelling measurements and the respective interaction parameters. Without being bound by any theory, these results may suggest that the difference between the extent of interactions of alcohol and water with Kraton 1101 is bigger than that with I-2VP. The values of $\chi_{13}$ and $\chi_3$ from Table 6, have been used along with $X_{12}=1.0$, to calculate the CRs using Equation 6. The plots of CR vs. polymer volume fraction in the ternary phase, $\phi_2$, are shown in FIGS. 6a and 6b. Both FIGS. 6a and 6b show plots of CR vs $\phi_3$ for different compositions of the binary liquid phase, i.e., different values of $v_1$. FIG. 6a shows that the CR values are close to or less than 1 for all values of $v_1$ and $\phi_2$ in the I-2VP membrane. Also, corresponding to an 8 wt % ethanol-water mixture, $\phi_3$ has been experimentally determined to be 0.76 using swelling measurement. This corresponds to a CR of ~0.7, and consequently a $CR^{-1}$ of ~1.4 indicating membrane to be water selective. On the other hand for the SBS membrane, Kraton 1101, shown in FIG. 6b, CR values are much greater than 1. For an 8 wt % ethanol-water mixture, $\phi_3$ has been experimentally determined to be 0.98 for Kraton 1101 membrane. This corresponds to a CR of ~3, indicating alcohol selectivity. FIGS. 6a and 6b also show that the selectivity of alcohol decreases with increasing concentration of alcohol in the liquid mixture.

Next, the values of membrane separation factor, β, for different membranes are compared with that of a commercial PDMS membrane. For the PDMS membrane β is 2.16, which is comparable to that for SBS2, SBS4, SBS62, SBS153, SBS257, and Kraton 1101 membranes. SBS1 (β=0.5) has different β values and lower permeability than other SBS samples (see Table 5). A 3 fold increase in membrane separation factor from SBS1 (β=0.5) to SBS4 (β=1.52) is observed. In order to understand the effect of molecular size distribution on the property of SBS membranes, GPC has been conducted for all the SBS polymers. FIG. 7 shows the GPC traces of all the SBS polymers. All of the commercial SBS samples except SBS4 (independently synthesized), are a mixture of diblock and triblock copolymers. SBS1 comprises about 80% diblock. The presence of diblock component may affect membrane transport. The GPC trace for SBS2 shows a smaller diblock fraction (~20%) and a shift of triblock peak towards smaller elution volume suggesting a larger polymer chain length. Also, for polymers SBS34, SBS62, SBS153 and SBS257 (GPC data not shown) larger MW samples show better membrane separation factors (see FIG. 7).

Another contributing factor to the difference in the observed membrane separation properties may be the difference in styrene fraction in the samples which may directly affect the microphase morphology of transport domains in different membranes. The morphology is shown in the TEM of SBS1 and SBS4 samples which have respectively 34% and 28.7% styrene (FIGS. 5a and 5b). As a result of $OsO_4$ staining, the butadiene domains appear dark and the styrene domains appear bright in these images. The microstructures of the two samples are different: SBS1 shows a lamellar morphology whereas SBS4 shows a cylindrical morphology with styrene cylinders embedded in a butadiene matrix. The lamellar domain spacing of SBS1 and cylindrical domain spacing of SBS4 samples were calculated to be ~24 nm and ~30 nm, for SBS1 and SBS4, respectively. Without being bound by any theory, this result suggests that the lamellar structure of SBS1 membrane may permeate water faster than ethanol despite the intrinsic hydrophobicity of the membrane. The cylindrical structures with continuous butadiene matrix as the transporting phase, on the other hand, permeated alcohol faster than water. This imparts the SBS4 membrane a 3 fold improvement in membrane separation factor, β, over SBS1 membrane. Therefore, the cylindrical morphology with polybutadiene as the continuous transport phase dramatically improved the transport over membranes with lamellar transport morphology of transporting domains.

A correlation between domain spacing and the membrane transport for alcohol pervaporation has been observed. By systematically varying the MW at a fixed composition of ~24% styrene for SBS34, SBS62, SBS153 and SBS257 samples (see Table 4), the domain spacing also increases from ~19 nm to 55 nm. Both the membrane separation factor (defined by ratio of permeability of alcohol to water) and overall flux increases with increasing domain spacing (see FIGS. 4 and 5).

In comparing the SBS membranes with the PDMS membrane, the permeability of a 160 μm thick PDMS membrane is about an order of magnitude greater than that of ~100 μm thick SBS membrane (see Table 5). The SBS membranes have about 3-5 times lower fluxes than the PDMS membrane for the same thickness. However, SBS membranes are more easily processed with better mechanical properties than the crosslinked PDMS membranes. SBS membranes of thicknesses ~10-50 μm may easily be cast and are easy to handle. As the pervaporation flux is inversely related to the membrane thickness, a ~10 μm SBS film will result into fluxes as high as ~300 gm/m²-hr.

TABLE 6

Determination of χ parameters

| Polymer | Density (Expt.) | Non-solvent | Uptake (wt %) | $v_p$ | χ |
|---|---|---|---|---|---|
| PI-P2VP | 0.9459 | Water | 31.33 | 0.7714 | 1.1837 |
|  |  | Ethanol | 56.45 | 0.5964 | 0.8742 |
| Kraton1101 | 0.9614 | Water | 0.93 | 0.9911 | 3.7979 |
|  |  | Ethanol | 2.096 | 0.9750 | 2.8548 |

Example 6

Composition Series: Selective Alcohol Separation from Aqueous Solution Using Polystyrene-Polybutadiene-Polystyrene (SBS) Copolymers Having Spherical, Cylindrical, and Lamellar Morphologies as the Membrane Material A composition series of SBS polymers was synthesized by varying the volume fraction of styrene to form different morphologies to study their effect on membrane transport. Table 7 provides polymer characterization data for the exemplary SBS polymers. The samples were used in pervaporation experiments.

TABLE 7

Polymer Characterization Data of Exemplary SBS Copolymers

| Polymer | $M_n$ (kg mol$^{-1}$) | Transporting phase vol. fraction | PDI | SAXS Morphology | d (nm) |
|---|---|---|---|---|---|
| SBS | 4.2-96.8-4.7 | 0.93 | 1.07 | spherical (bcc) | 37.9 |
| SBS | 15.3-68.8-13.8 | 0.74 | 1.04 | cylindrical | 34.9 |
| SBS | 18.6-50.0-18.9 | 0.61 | 1.04 | lamellar | 35.5 |

FIG. 9 shows the alcohol pervaporation results and rheological characterization data for an exemplary SBS polymer sample having spherical (bcc) morphology as described in Table 7. Owing to their lack of strength as shown in FIG. 9d (rheological characterization), thicker membranes (~150 μm)

were needed. $M_{SF}$ and normalized flux for a 50 μm membrane as a function of temperature is shown in FIGS. 9a and 9b. The $M_{SF}$ values are independent of temperature and are also lower ($M_{SF}$=1.2) than our previously obtained highest $M_{SF}$ values ($M_{SF}$=1.8) with cylindrical morphology (polystyrene volume %=0.2) and higher domain spacing (d=39 and 55 nm) membranes.

FIG. 10 shows the alcohol pervaporation results and rheological characterization data for an exemplary SBS polymer sample having cylindrical morphology (polystyrene volume %=0.26) as described in Table 7. As shown in FIG. 10d (rheological characterization), these membranes have a higher modulus due to an increased amount of polystyrene in them. FIGS. 10a and 10b show $M_{SF}$ and normalized flux for a 50 μm membrane as a function of temperature. The $M_{SF}$ values increase with increasing temperature and are slightly lower ($M_{SF}$=1.7) than our previously obtained highest $M_{SF}$ values ($M_{SF}$=1.8) with cylindrical morphology (polystyrene volume %=0.2) and higher domain spacing (d=39 and 55 nm) membranes. Flux at 60° C. is 60 g/m²-h.

FIG. 11 shows the alcohol pervaporation results and rheological characterization data for an exemplary SBS polymer sample having lamellar morphology (polystyrene volume %=0.39) as described in Table 7. As shown in FIG. 11d (rheological characterization), these membranes have a higher modulus due to an increased amount of polystyrene in them. FIGS. 11a and 11b show $M_{SF}$ and normalized flux for a 50 μm membrane as a function of temperature. While the $M_{SF}$ values increase with increasing temperature in these membranes, they are much lower ($M_{SF}$=1.1) than our previously obtained highest $M_{SF}$ values ($M_{SF}$=1.8) with cylindrical morphology (polystyrene volume %=0.2) and higher domain spacing (d=39 and 55 nm) membranes. Flux at 60° C. is 40 g/m²-h.

Example 7

Molecular Weight Series: Selective Alcohol Separation from Aqueous Solution Using Polystyrene-Polybutadiene-Polystyrene (SBS) Copolymers Having Cylindrical and Lamellar Morphologies as the Membrane Material A molecular weight series of SBS copolymers having cylindrical and lamellar morphologies was synthesized to investigate the effect of domain spacing on flux and $M_{SF}$.

FIGS. 12a and 12b show SAXS and TEM data for two different exemplary SBS polymer samples with different domain spacings for both lamellar and cylindrical morphologies. The domain spacings for the cylindrical morphology are 34.9 nm and 39.1 nm. The domain spacings for the lamellar morphology are 35.5 and 45.9 nm.

Example 8

Pervaporation of Fermentation-Broth Feed Sample with SBS Membrane

Figure 1A:
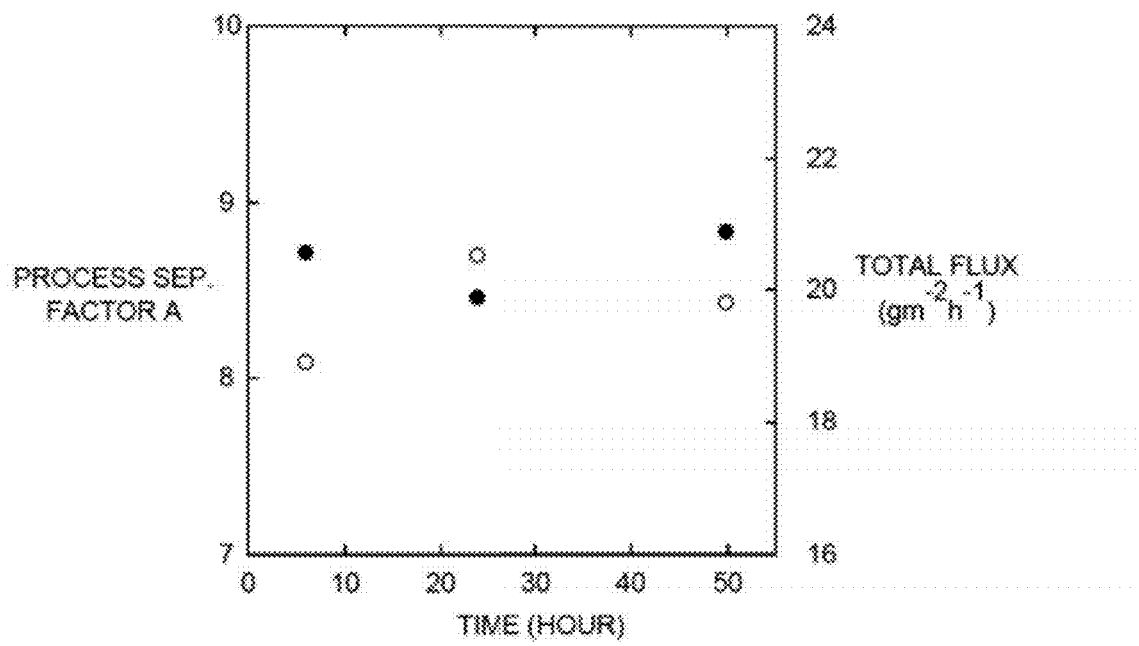
Figure 1B:
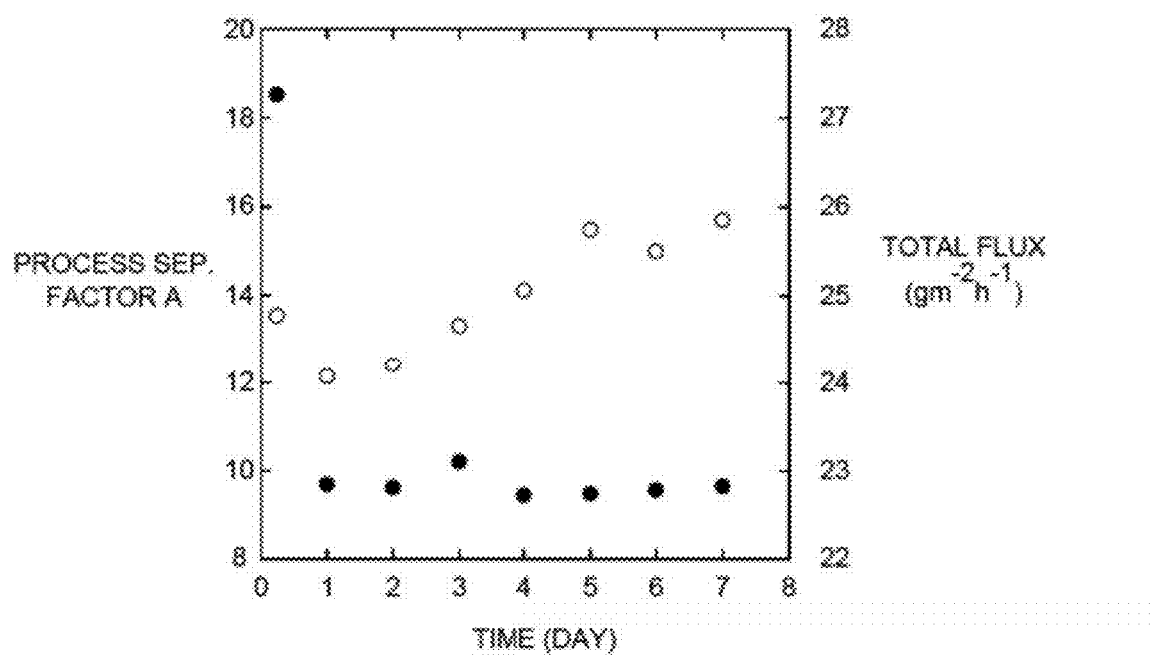
Figure 1C:
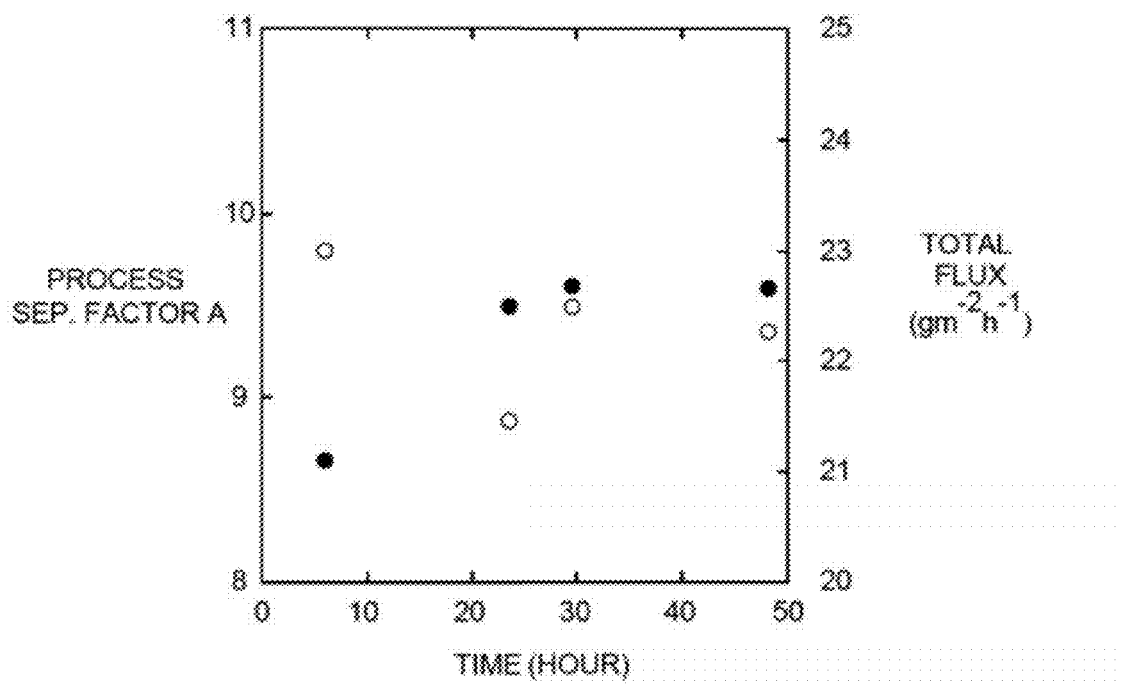
Figure 2:
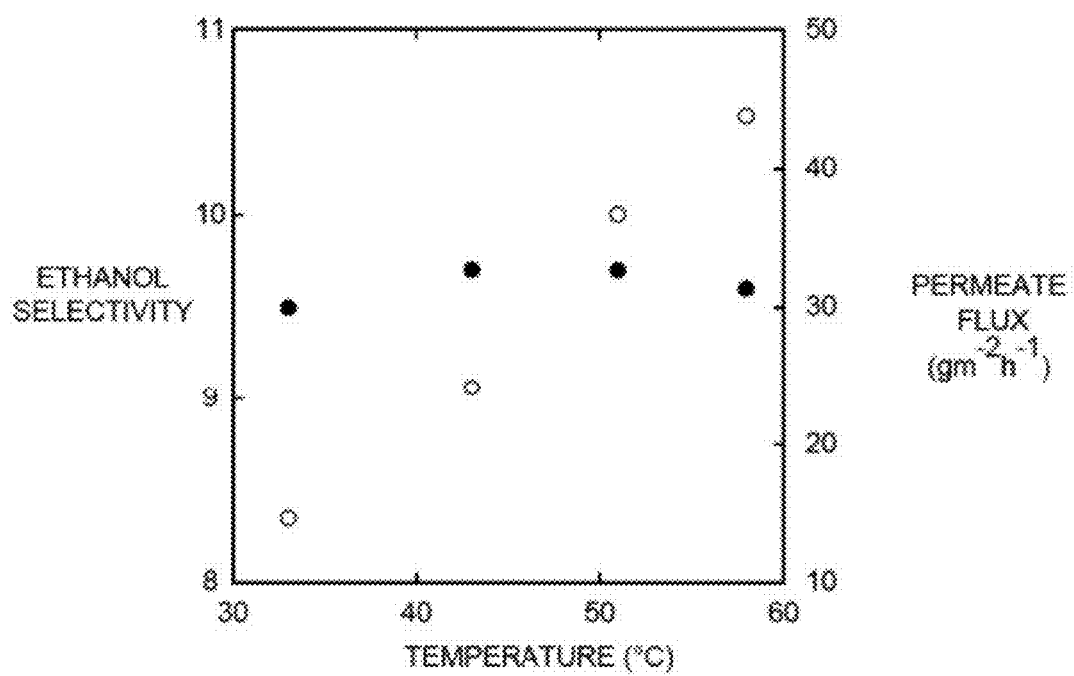
Figure 3:
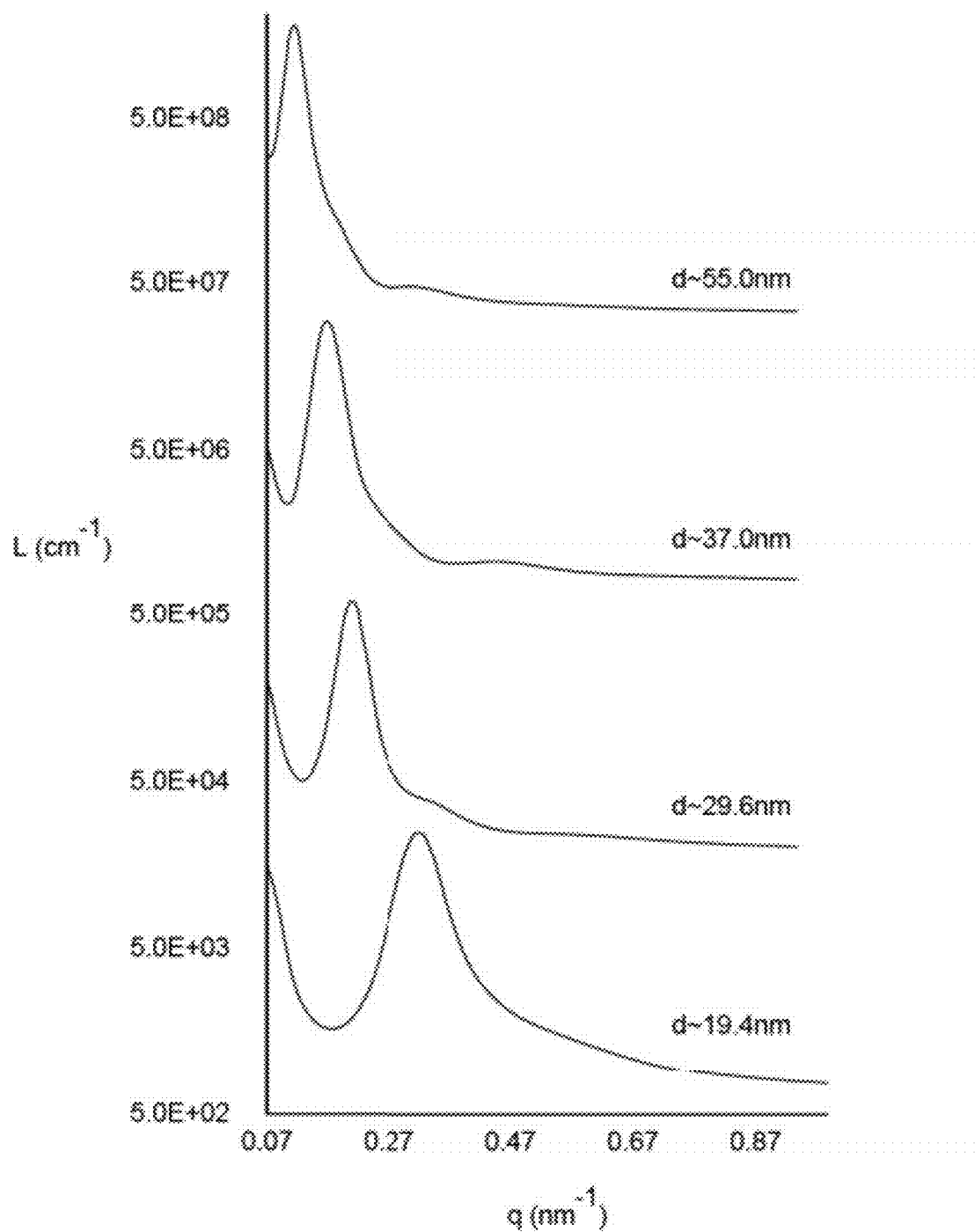
Figure 4:
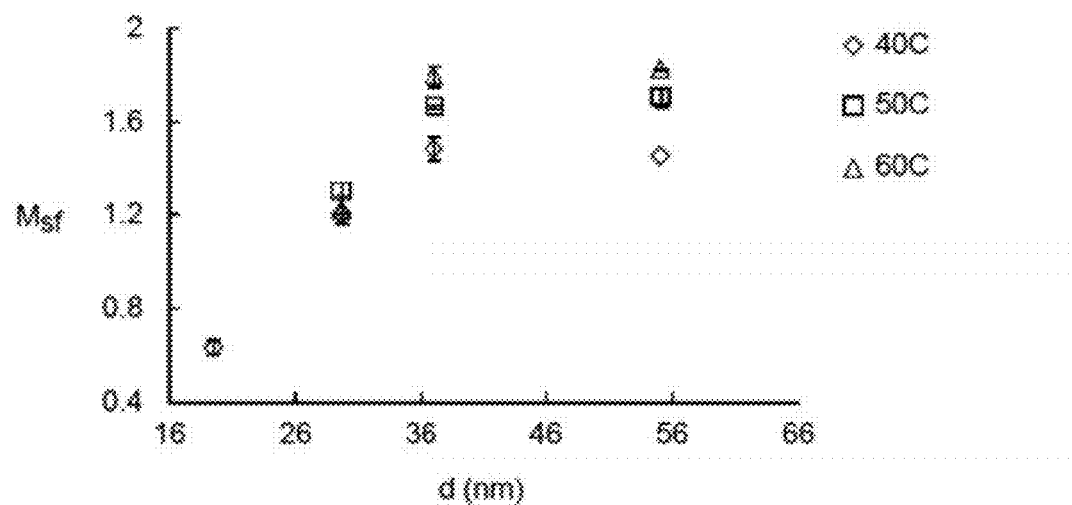
Figure 5:
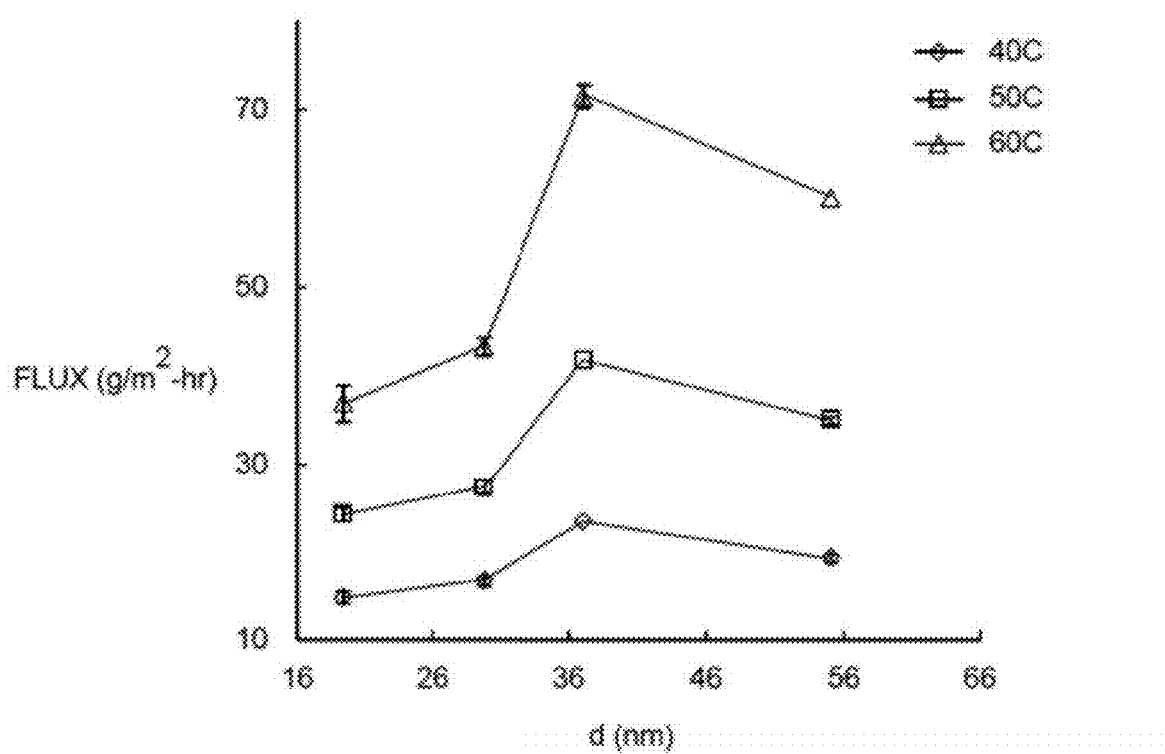
Figure 6A:
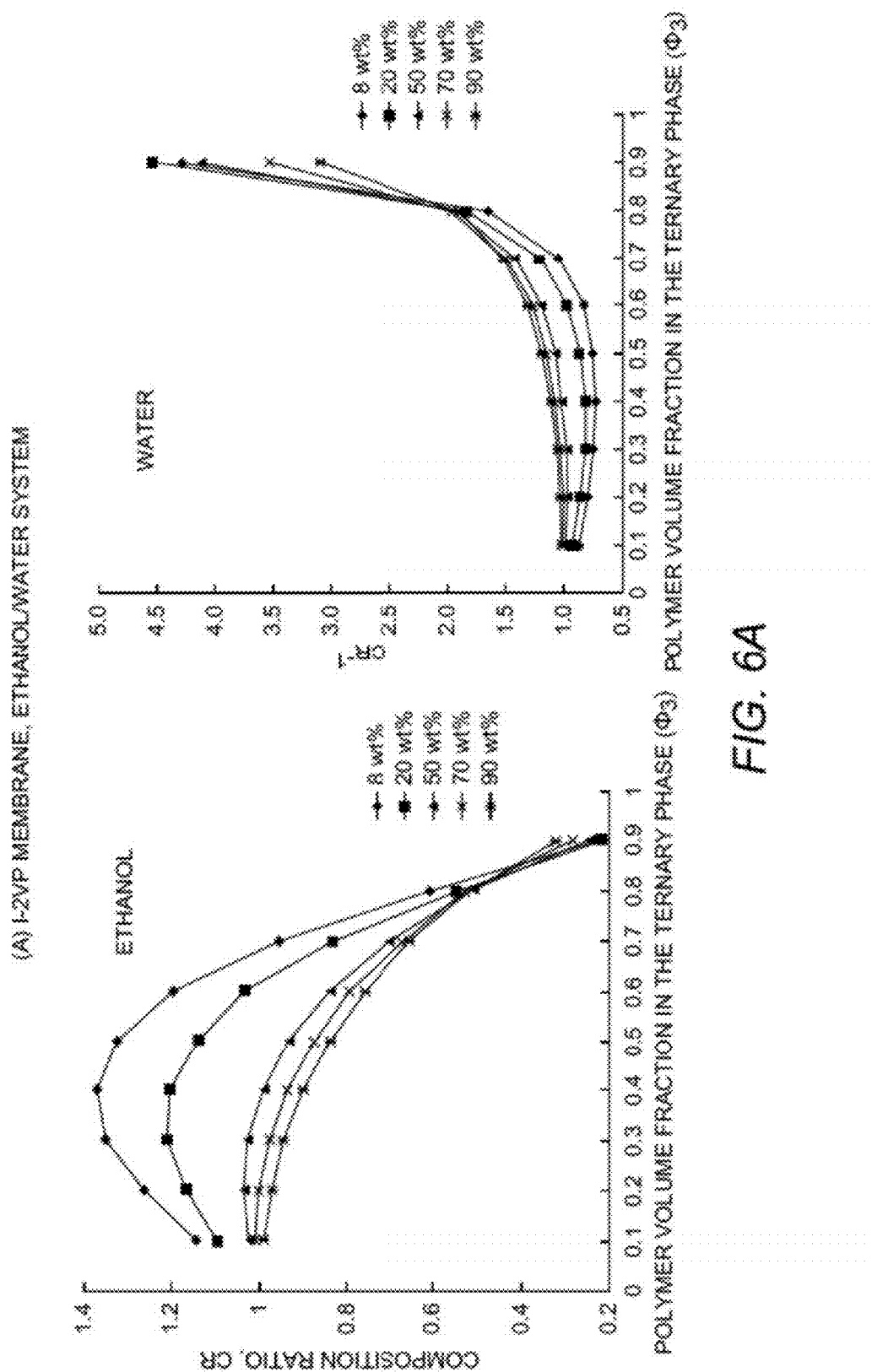
Figure 6B:
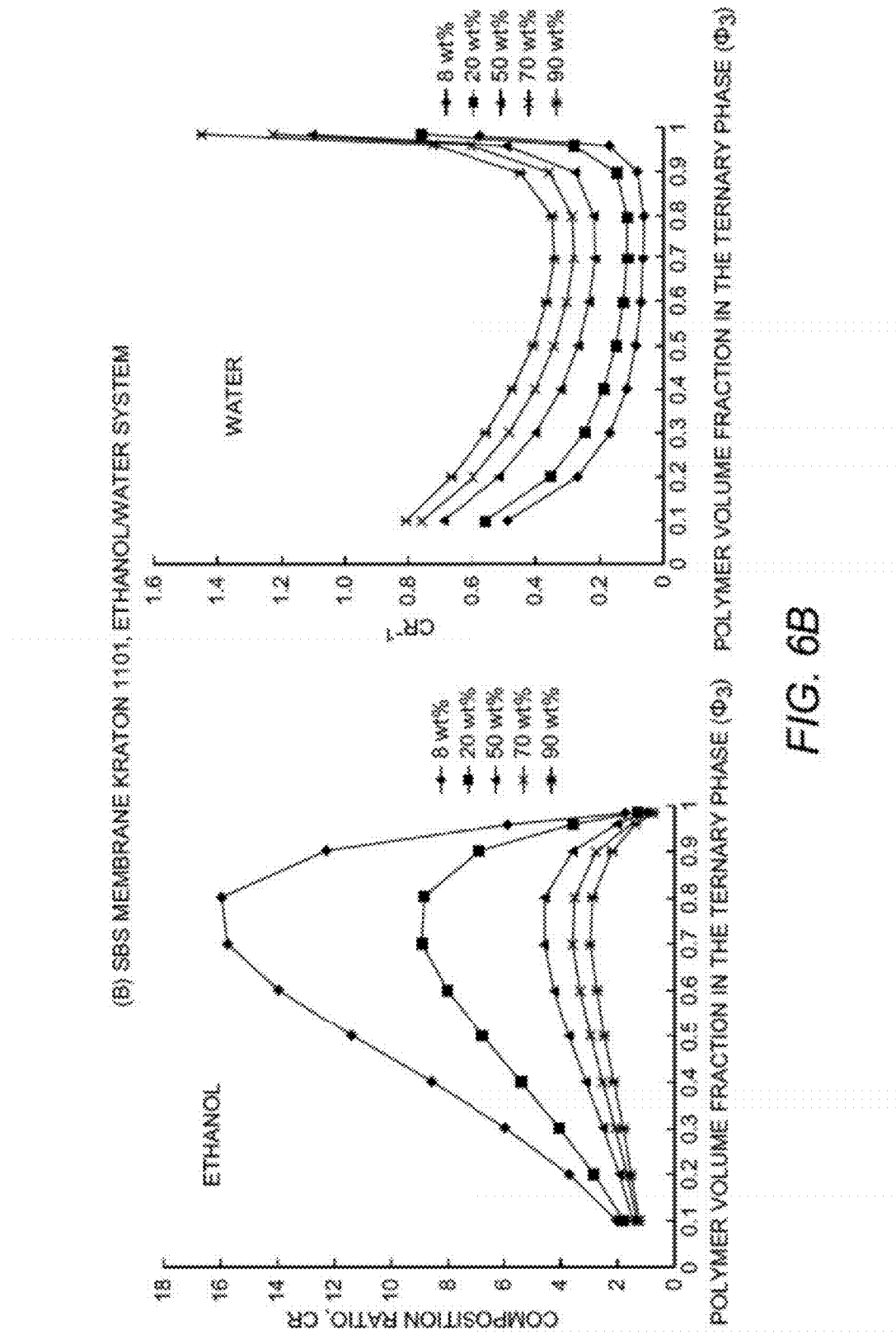
Figure 7:
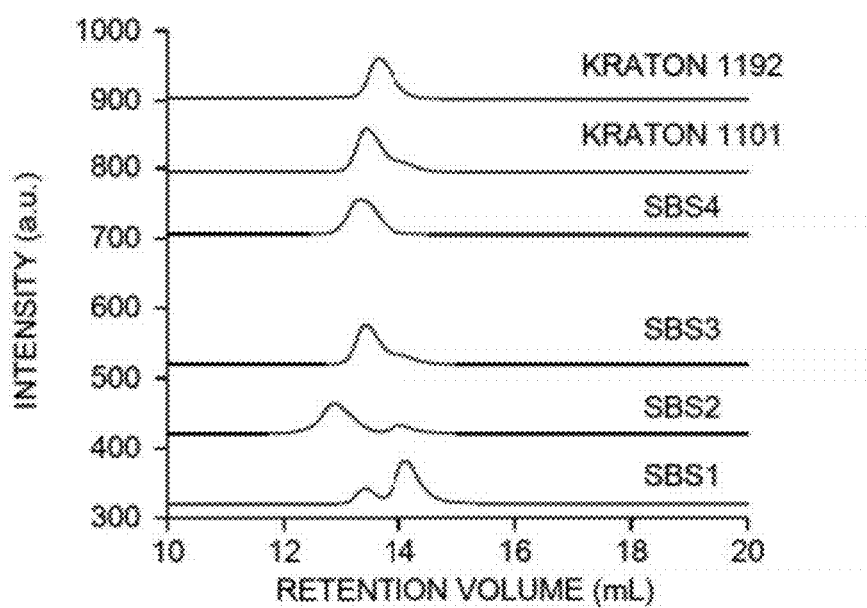
Figure 8A:
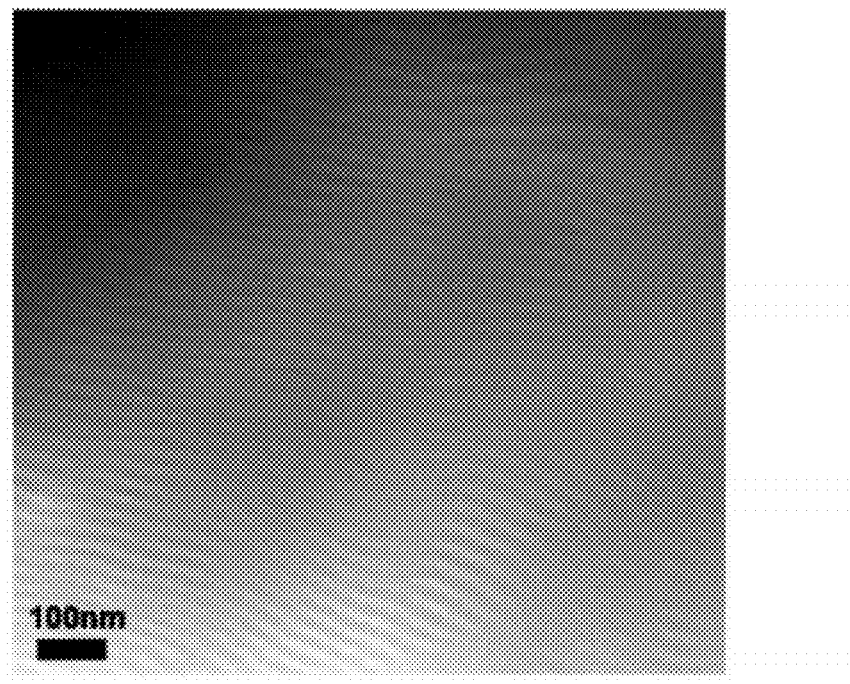
Figure 8B:
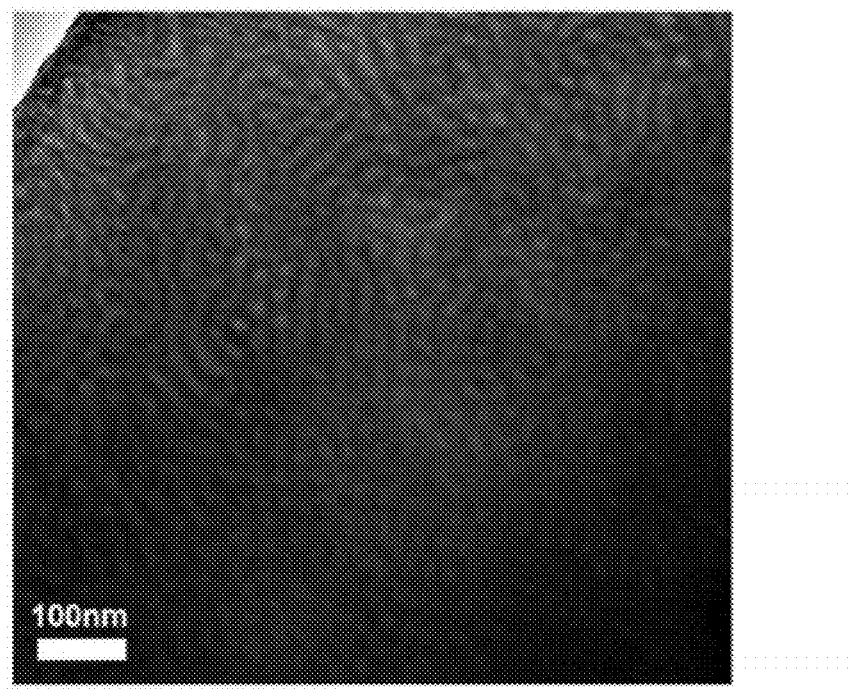
Figure 9:
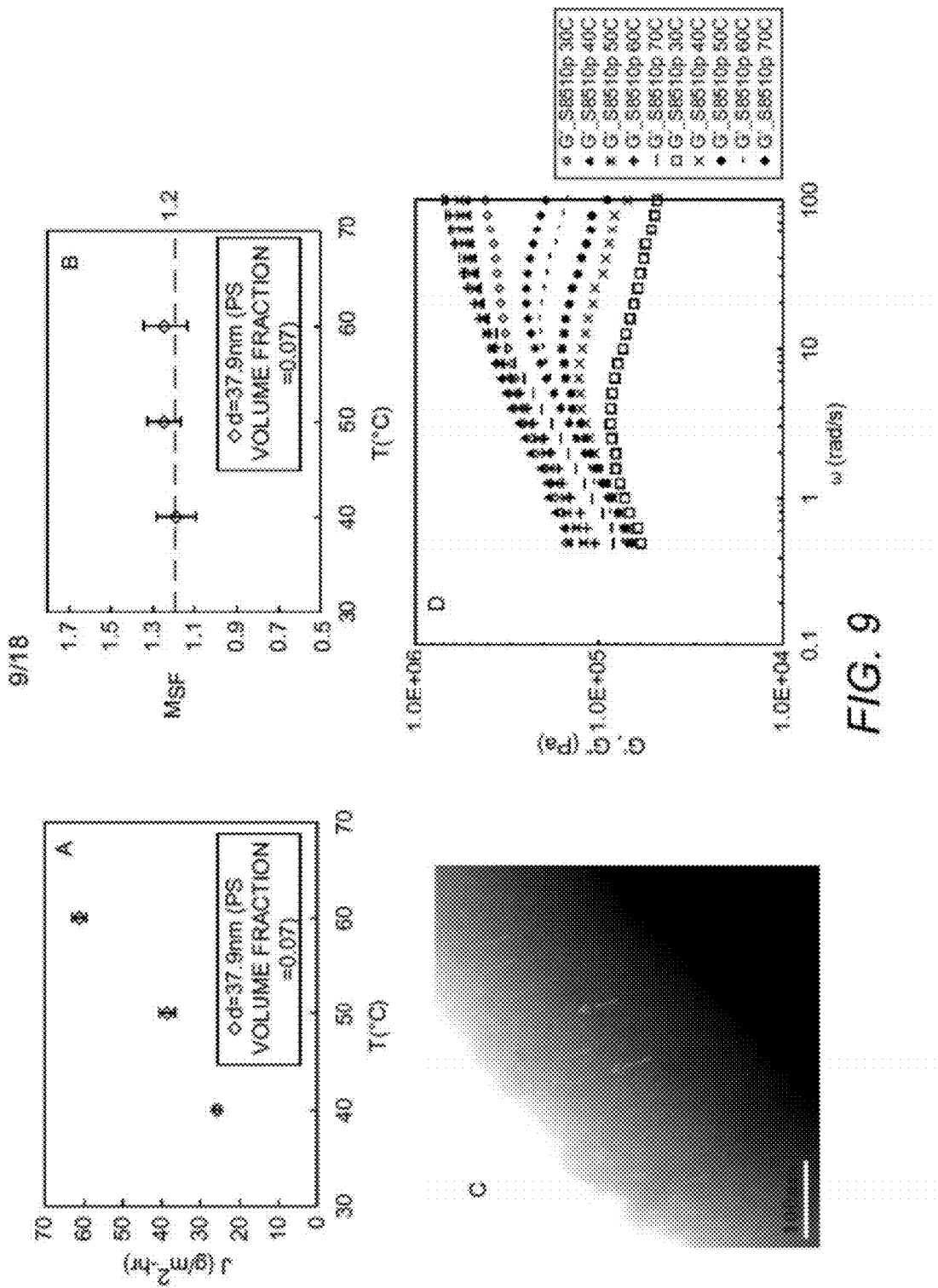
Figure 10:
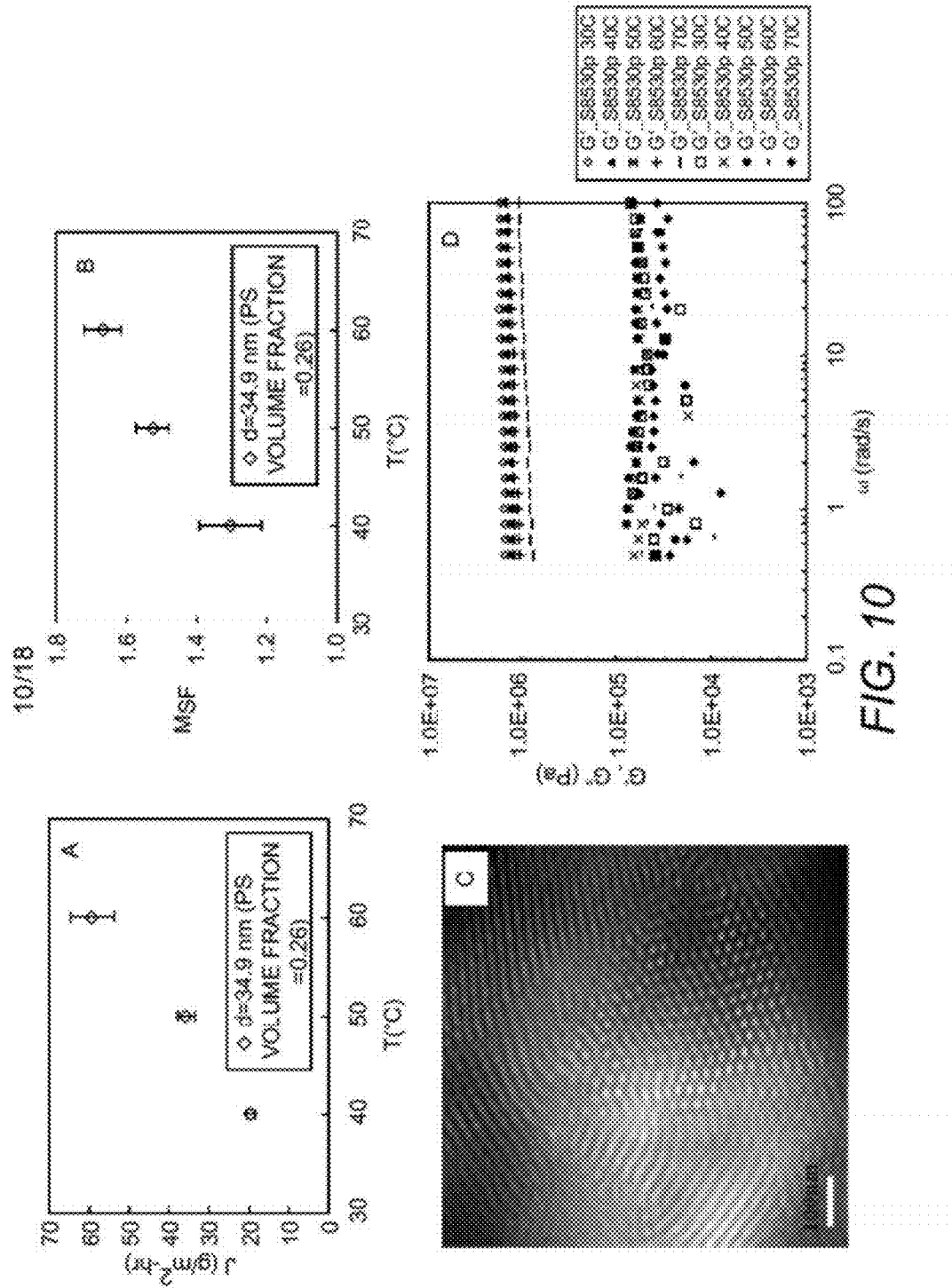
Figure 11:
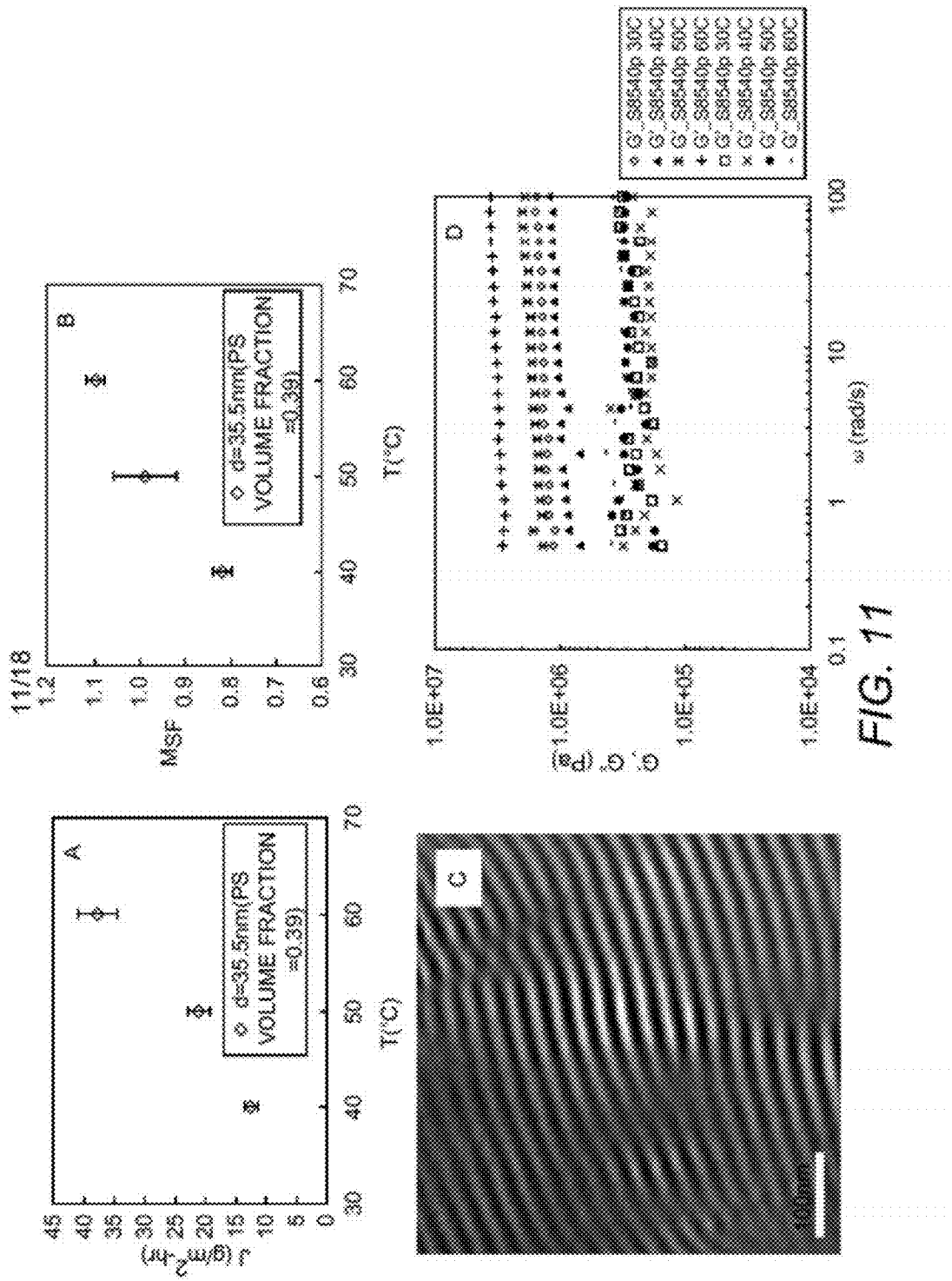
Figure 12B:
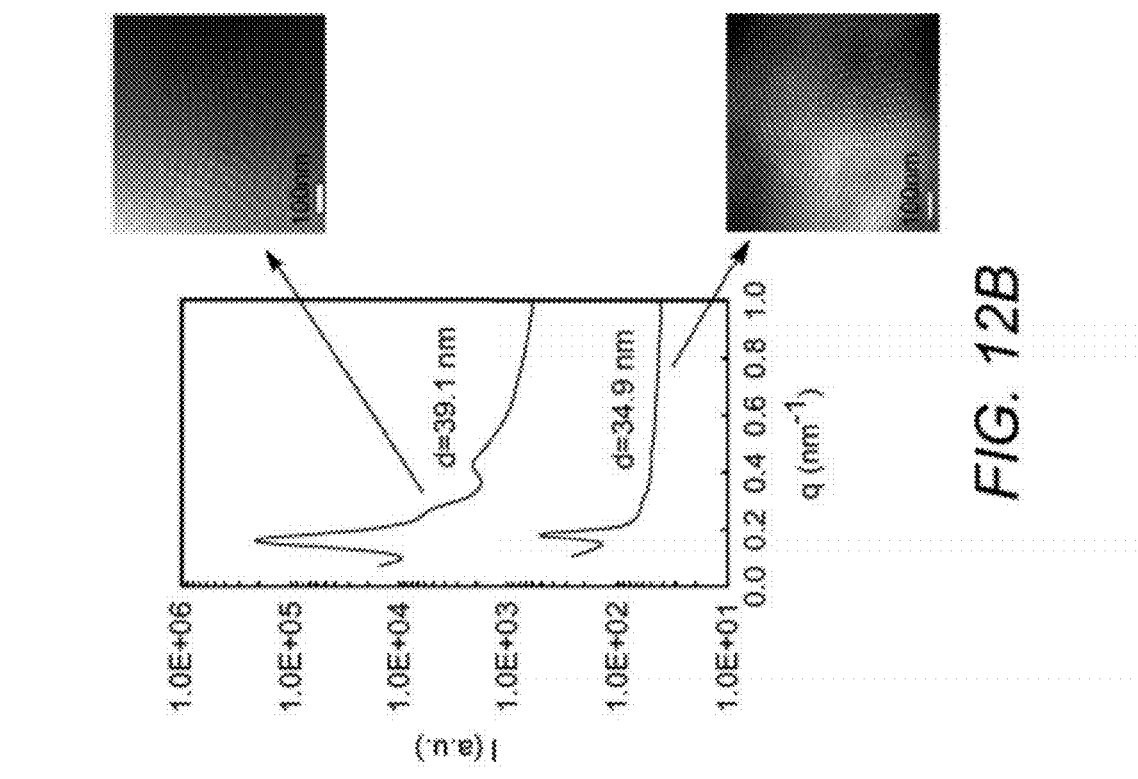
Figure 12A:
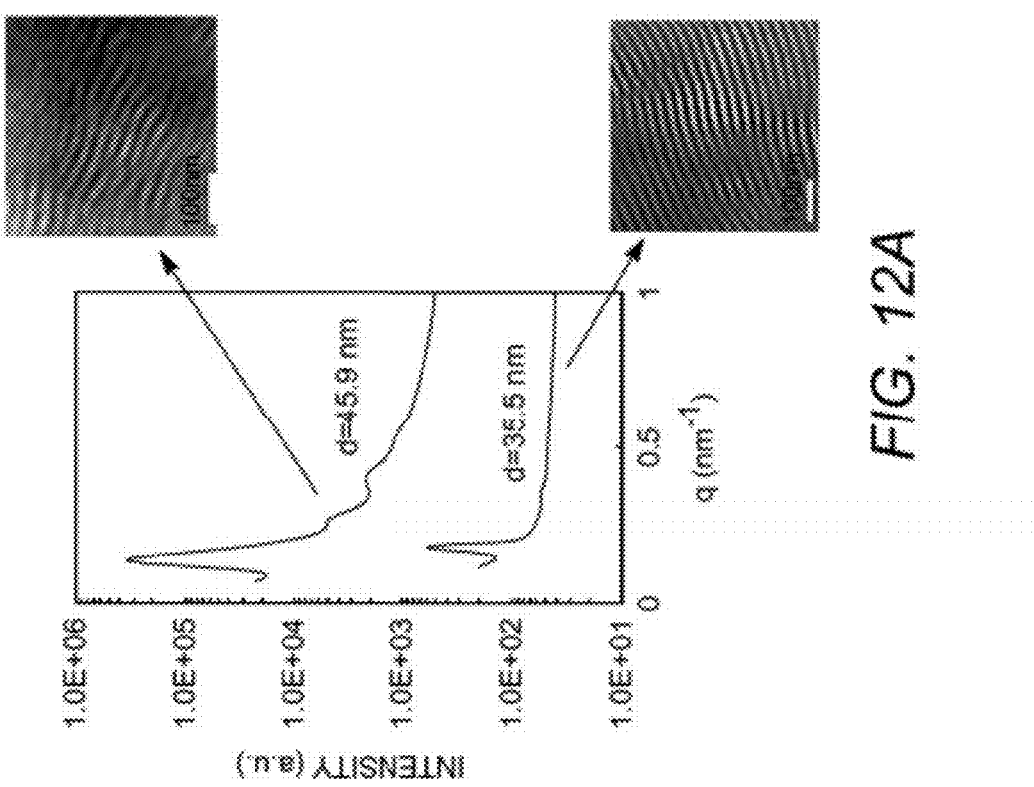
Figure 13A:
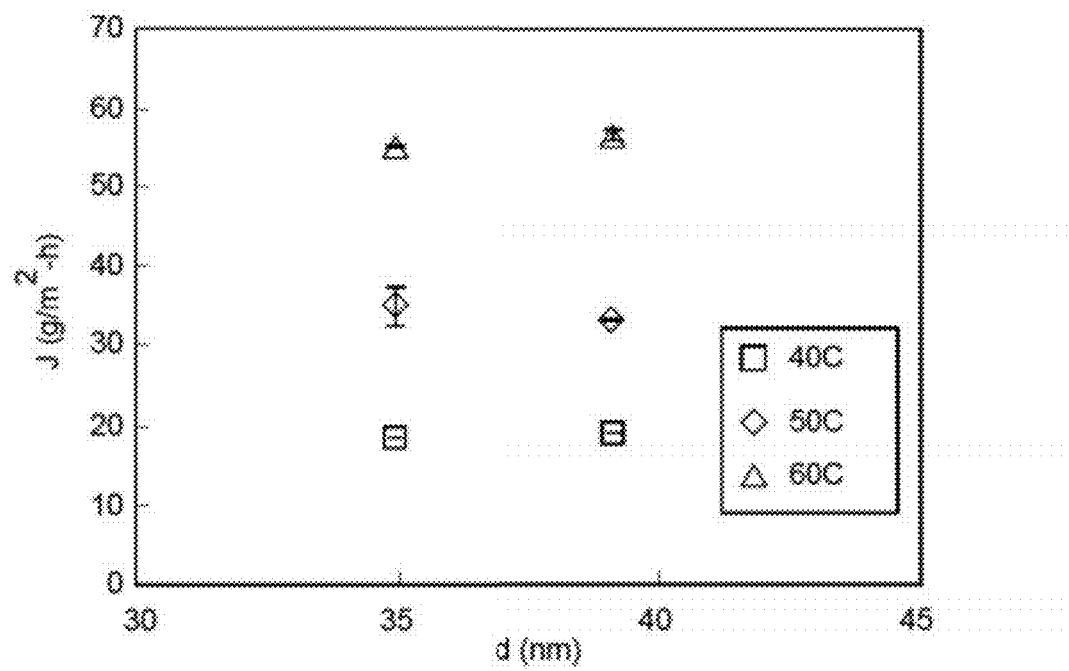
FIG. 13 shows flux and $M_{SF}$ for membranes prepared from exemplary SBS polymer samples having cylindrical morphology and two different domain spacings. Both flux and $M_{SF}$ show marginal increases as the domain spacing is increased from 35 to 39 nm.
Figure 13B:
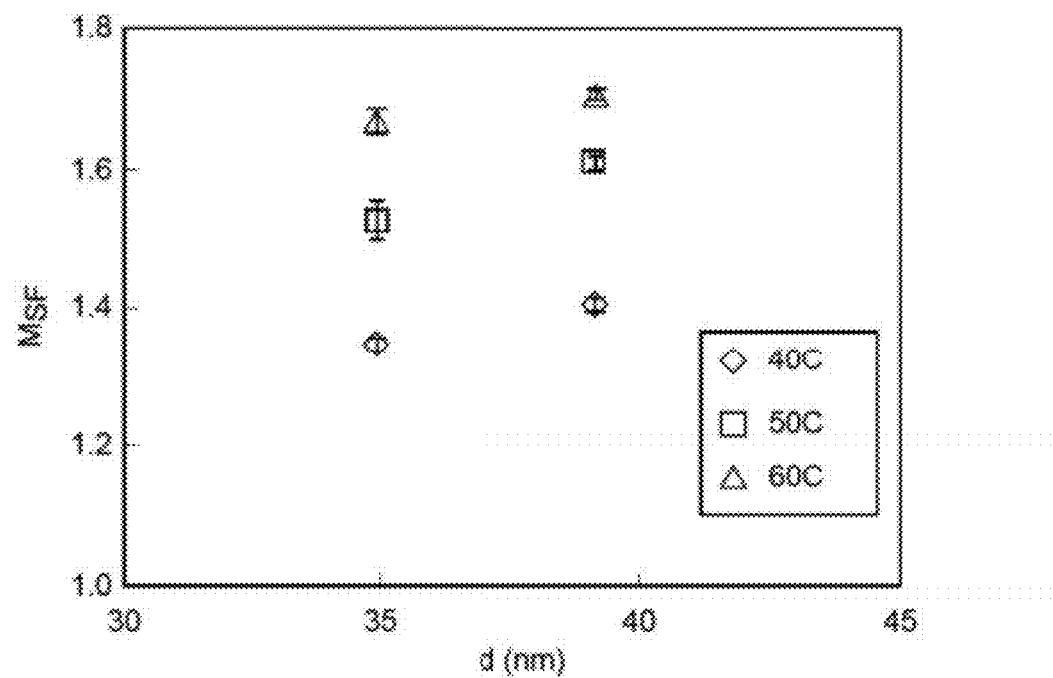
Figure 14A:
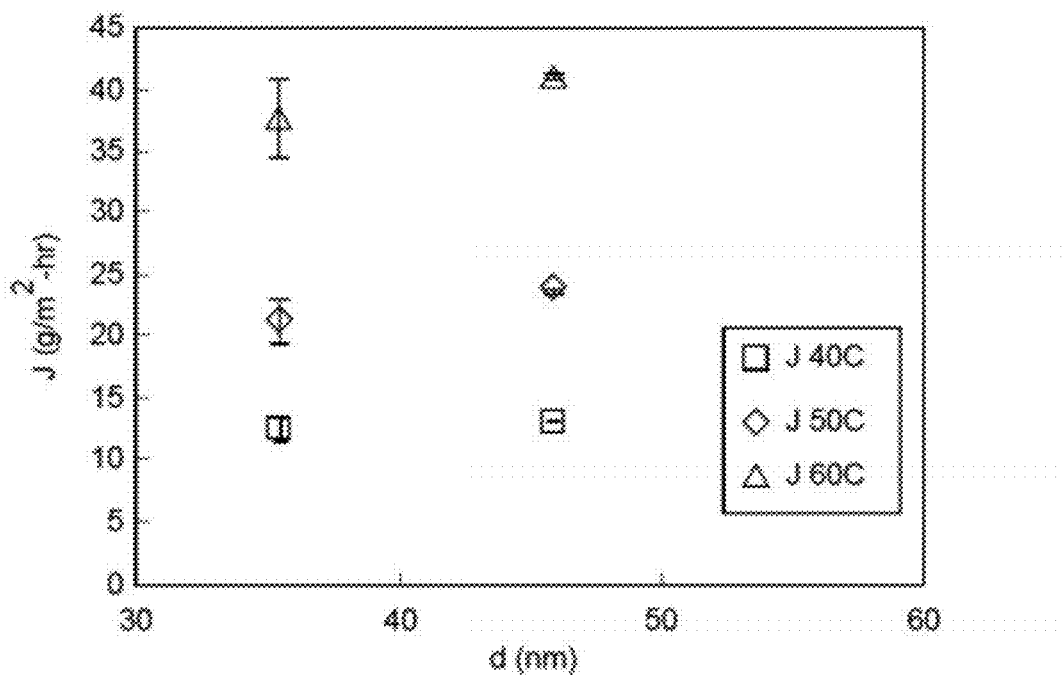
FIG. 14 shows flux and $M_{SF}$ for membranes prepared from exemplary SBS polymer samples having lamellar morphology and two different domain spacings. While flux seems to increase slightly, there is an increase in $M_{SF}$ from 1.1 to 1.4 as the domain spacing is increased from 35.5 to 45.9 nm.
Figure 14B:
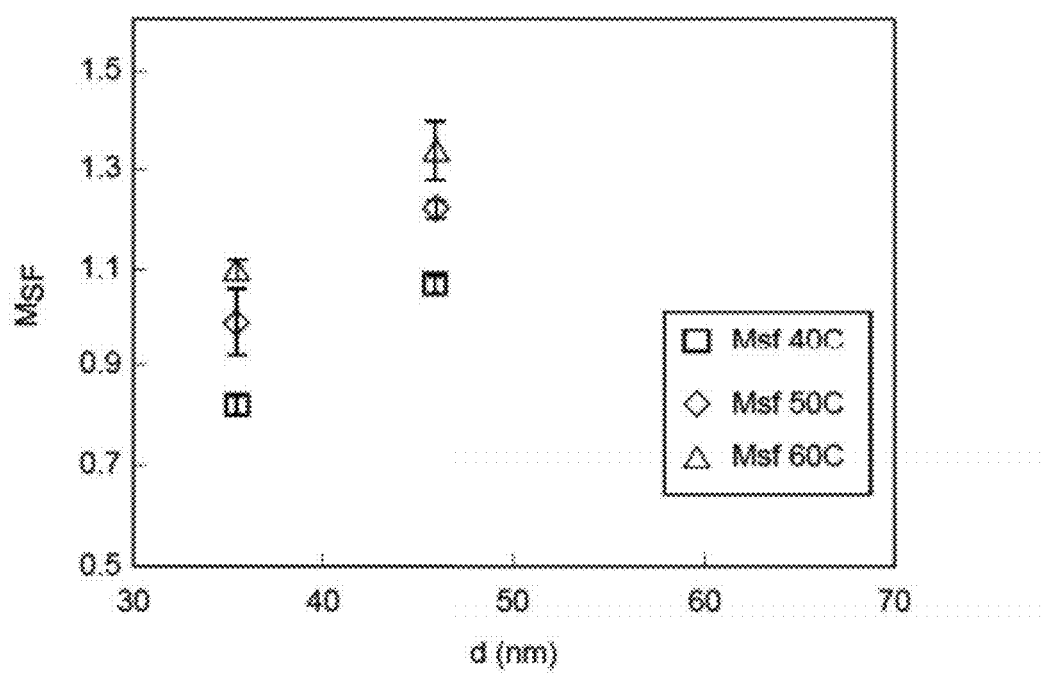
Figure 15:
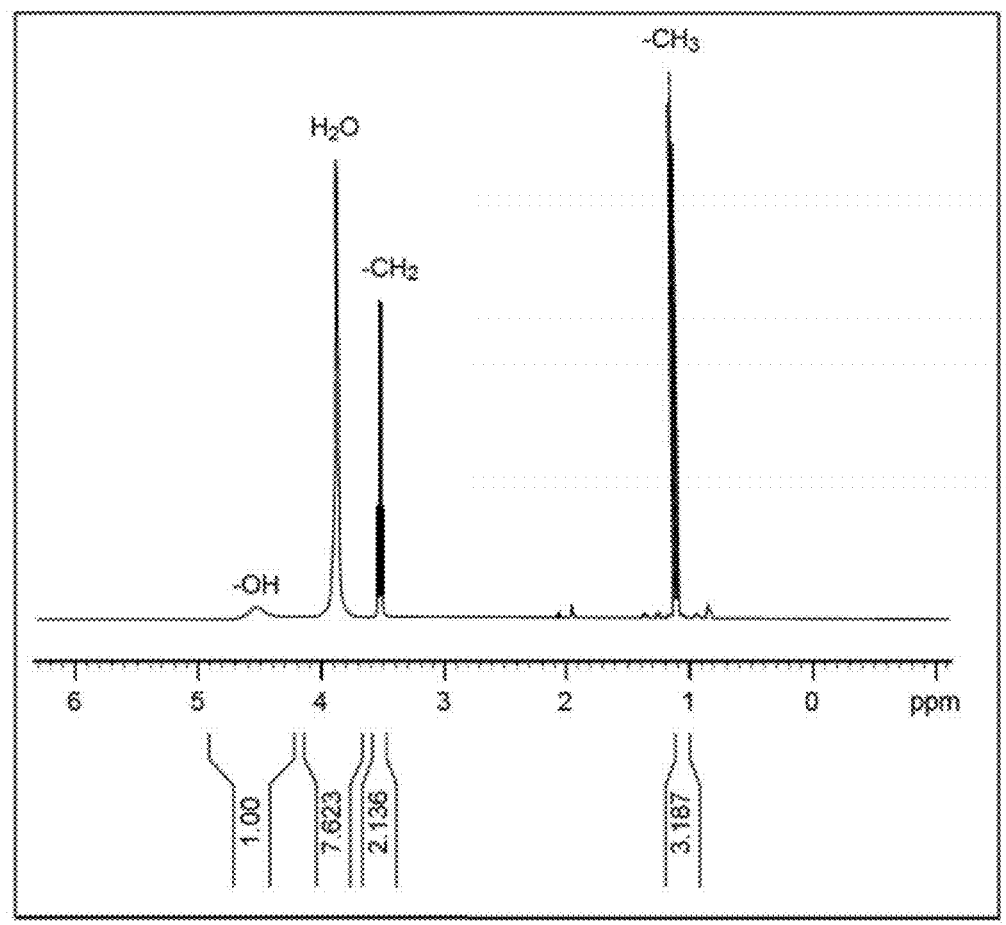

Pervaporation of fermentation-broth feed sample containing ~8-10 wt % ethanol was run using SBS207 (polystyrene volume fraction of =0.2, domain spacing=55 nm). The pervaporation was run at 60° C. with a 51 μm thick membrane. A flux of 85.5 g/m²-h and a permeate composition of 40.14 wt % ethanol was achieved. The initial feed was brownish in color, but the permeate coming through the membrane was colorless. There was no degradation in membrane performance over the experimental run which lasted 48 hours. FIG. 15 shows the $^1$H NMR spectrum of a permeate sample containing 40.14 wt % ethanol in the permeate using a SBS membrane.

Example 9

Composition and Molecular Weight Series: Selective Alcohol Separation from Aqueous Solution Using Polystyrene-Polybutadiene-Polystyrene (SBS) Copolymers Having Spherical, Cylindrical, and Lamellar Morphologies as the Membrane Material A molecular weight series of SBS polymer samples of different compositions were synthesized and studied. Table 8 provides polymer characterization data of exemplary SBS polymer samples.

TABLE 8

Polymer Characterization Data of Exemplary SBS Polymer Samples.

| morphology | PS volume fraction | MW | domain spacing (nm) |
|---|---|---|---|
| spherical (bcc) | 0.07 | 4.2k-96.8k-4.7k | 37.9 |
|  |  | 7.0k-150.5k-8.4k | 51.2 |
| cylindrical | 0.26 | 5.5k-24.2k-5.2k | 21.7 |
|  |  | 8.9k-39.2k-7.8k | 26.6 |
|  |  | 15.3k-68.8k-13.8k | 34.9 |
|  |  | 22.4k-93.9k-18.7k | 40.9 |
| cylindrical | 0.34 | 8.7k-28.5k-8.9k | 24.8 |
| lamellar | 0.37 ± 0.02 | 11.8k-37.4k-12.6k | 30.4 |
|  |  | 18.6k-50.0k-18.9k | 35.5 |
|  |  | 28.4k-83.4k-28.5k | 45.9 |

Figure 16A:
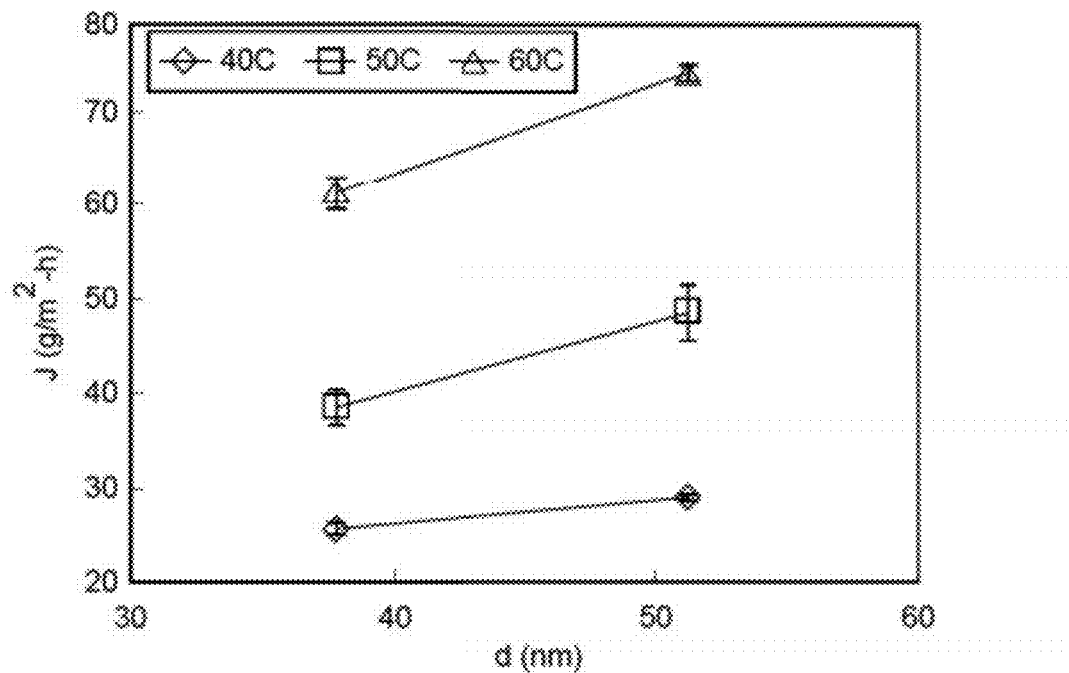
Figure 16B:
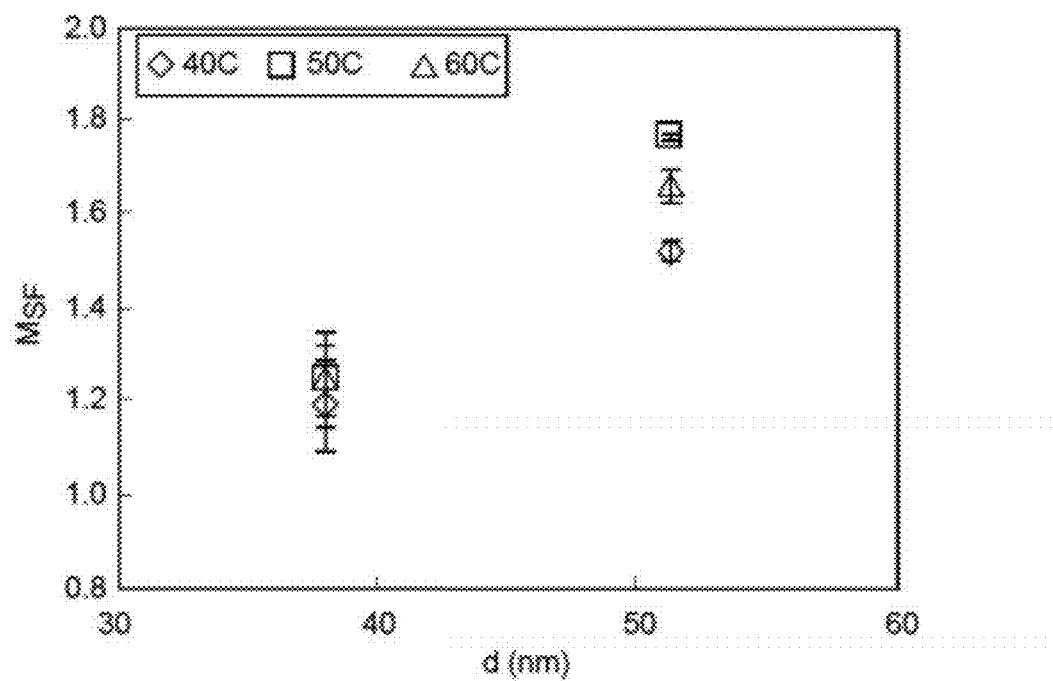

FIG. 16 shows alcohol pervaporation results for membranes composed of SBS polymer samples having spherical (bcc) morphology and two different domain spacings. Both flux and $M_{SF}$ increase as the domain spacing is increased from 37.9 nm to 51.2 nm for 50 μm membranes. The performance is comparable in flux to a high performing SBS polymer membrane (largest domain spacing SBS membrane with PS fraction of 0.2; flux~75 g/m²-h), but worse in terms separation factor ($M_{SF}$~1.6 vs. $M_{SF}$~1.8 at 60° C.). It is observed that the $M_{SF}$ values for the bcc morphology membranes worsen as the temperature is increased from 50 to 60° C. This is likely due to a high polybutadiene content that makes these membranes less rigid and their sorption behavior gets altered at higher operating temperature. Higher operating temperature, however, may be preferred to obtain higher permeation fluxes if the decline in membrane selectivity can be prevented.

Figure 17A:
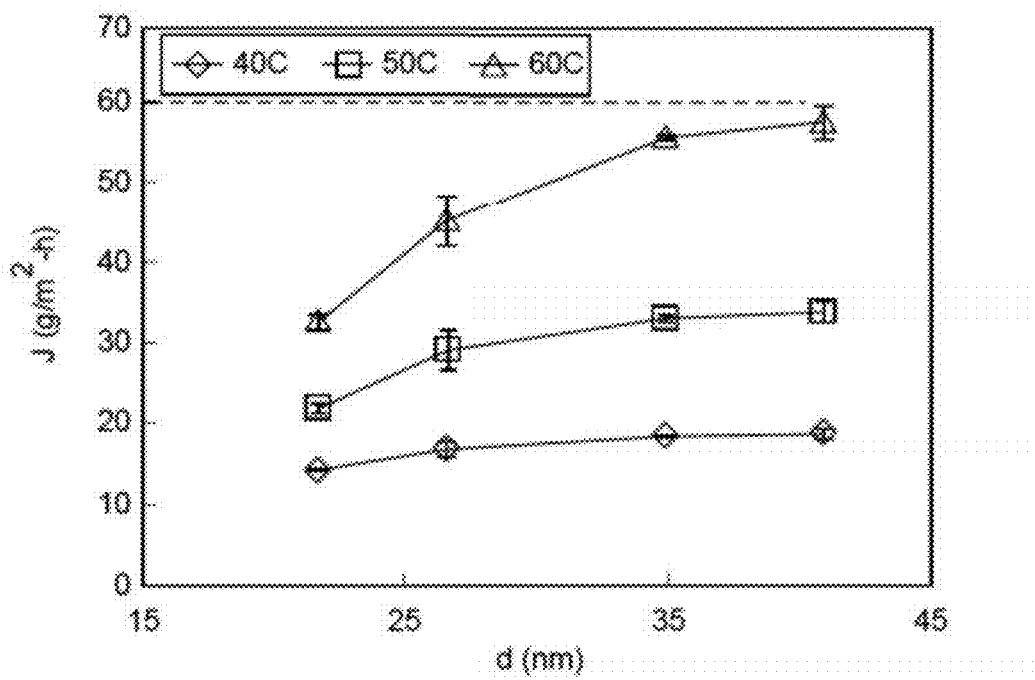
Figure 17B:
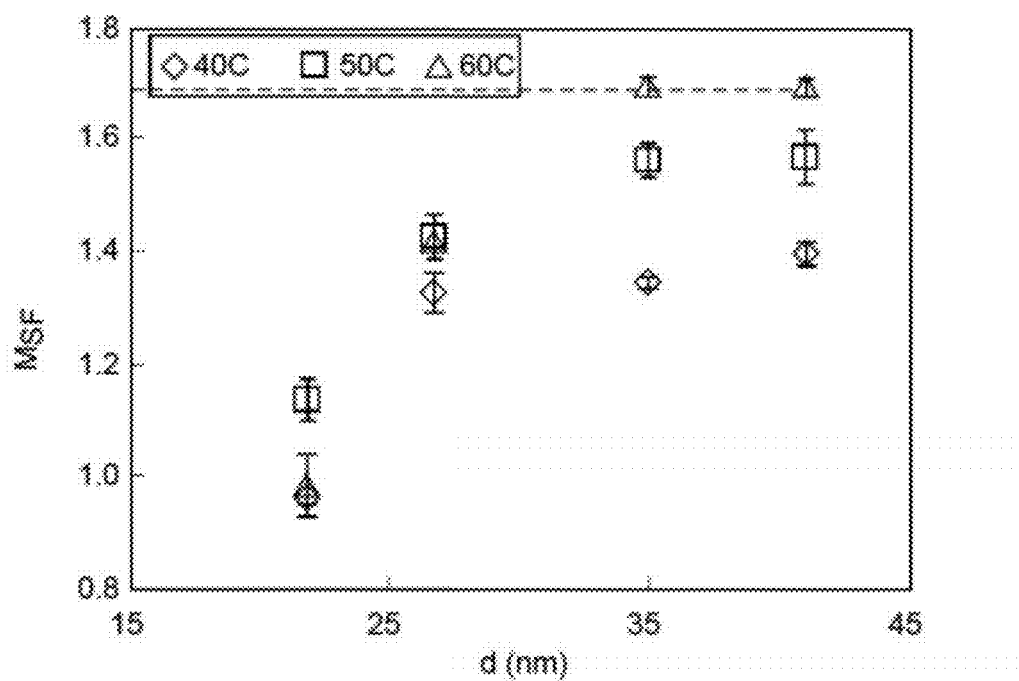

FIG. 17 shows alcohol pervaporation results for membranes composed of SBS polymer samples having cylindrical morphology and four different domain spacings ($\Phi_{PS}$=0.26). These samples show qualitatively similar trends in flux and $M_{SF}$ as previously observed for the cylindrical SBS samples with $\Phi_{PS}$=0.2. Both flux and $M_{SF}$ increase with increasing domain spacing. Also, for larger domain spacing samples, $M_{SF}$ increases with temperature up to 60° C. unlike their bcc morphology counterparts. Without being bound by any theory, this may be due to increased rigidity of these membranes at higher PS fractions. The maximum in flux and $M_{SF}$ are 60 g/m²-h and 1.7 respectively, which is lower than those for the cylindrical samples with $\Phi_{PS}$=0.2. One of the low molecular weight samples for the cylindrical morphology with $\Phi_{PS}$=0.34 and d=24.8 nm (see Table 8), showed a flux of 43.6 g/m²-h and an $M_{SF}$ of 1.4 at 60° C. for a 50 μm thick membrane. The high molecular weight sample with d=57.5 nm could not be tested due to brittleness of membrane (likely due to a high molecular weight and polystyrene fraction).

Figure 18A:
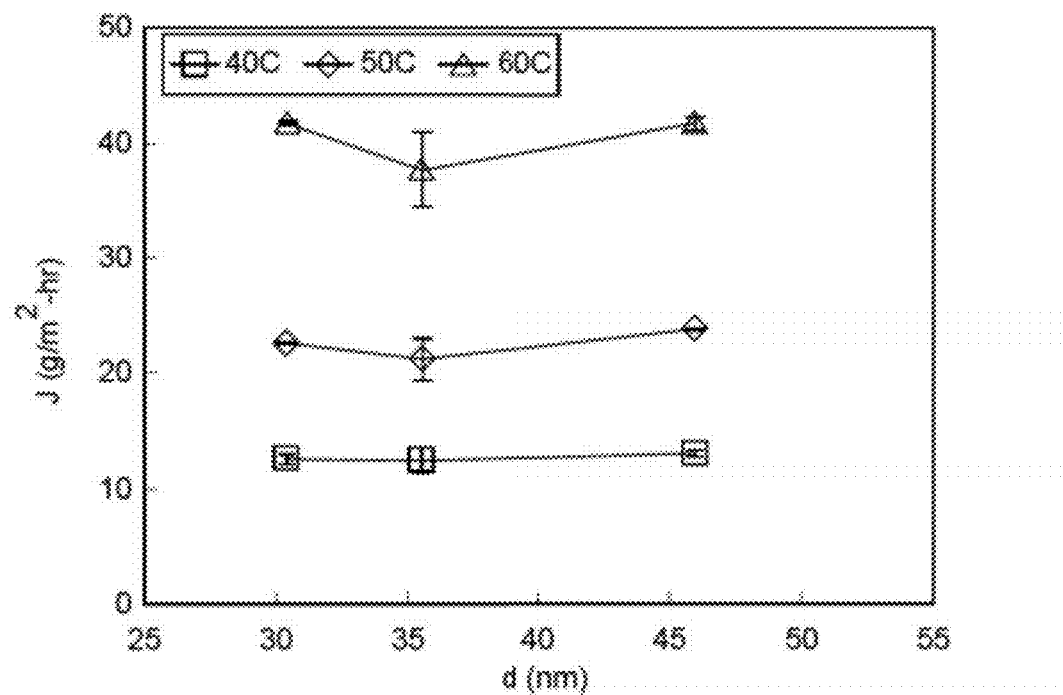
Figure 18B:
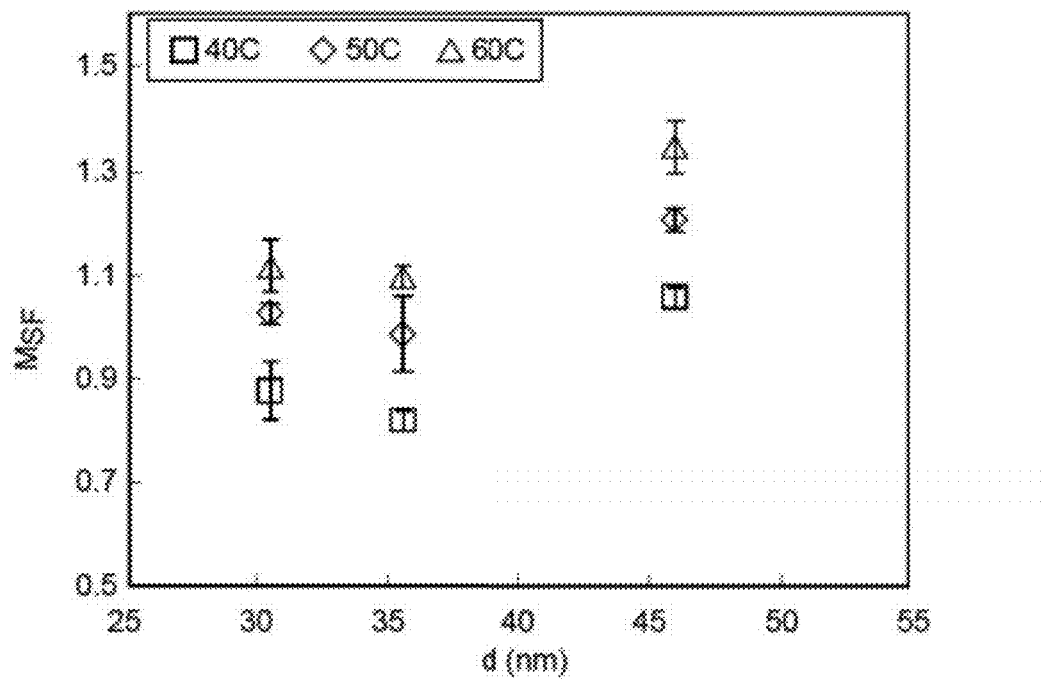

FIG. 18 shows alcohol pervaporation results for membranes composed of SBS polymer samples having lamellar morphology and two different domain spacings ($\Phi_{PS}$=0.37±0.02). Lamellar morphology membranes appear to be least responsive to changes in domain spacing. FIG. 18a shows that the flux does not change within experimental deviation as the domain spacing is increased. FIG. 18b shows a moderate increase in $M_{SF}$ with domain spacing. The flux and $M_{SF}$ values for lamellar morphology samples are lower than those for cylindrical morphology with $\Phi_{PS}$=0.20. Without being bound by any theory, it is likely that the transport within the lamellar structure gets affected by the presence of lamellar grain boundaries.

A summary of the SBS and DCD polymer samples studied are shown for comparison in Table 9 and Table 10.

$M_{SF}$ and flux values at 60° C. for SBS and 43° C. for DCD have been shown. Since DCD samples were only run at 43° C., Table 10 shows interpolated data for SBS polymers at 43° C. for comparison (for DCD, $M_{SF}$ did not depend on temperature unlike SBS membranes). The molecular weight (MW) values reported are for both the individual block molecular weights and the overall molecular weights of SBS and DCD triblock copolymers. Also, the overall process separation factor in our system is $P_{SF}$=4.15×$M_{SF}$. For reference, a $M_{SF}$ of 1.8 corresponds to a 40 wt % permeate ethanol composition starting with an 8 wt % feed.

TABLE 9

Summary of Pervaporation Results with SBS and DCD Triblock Copolymers at 60° C.

| Polymer | Morphology | $\phi_{PS}$ | MW (kg/mol) | d (nm) | $M_{SF}$ (60° C.) | Flux (g/m²-h), t = 50 μm, 60° C. |
|---|---|---|---|---|---|---|
| SBS | spherical (bcc) | 0.07 | 4.2-96.8-4.7 = 105.7 | 37.9 | 1.25 | 61.3 |
|  |  |  | 7.0-150.5-8.4 = 165.9 | 51.2 | 1.66 | 74.3 |
|  | cylindrical | 0.2 | 4.6-26.2-3.4 = 34.2 | 19.4 | 0.33 | 37.2 |
|  |  |  | 9.0-47.0-5.7 = 61.7 | 29.6 | 1.22 | 45.2 |
|  |  |  | 14.2-90.9-13.1 = 118.2 | 39.4 | 1.79 | 70.7 |
|  |  |  | 26.6-158.0-22.5 = 207.1 | 55 | 1.83 | 70.9 |
|  | cylindrical | 0.26 | 5.5-24.2-5.2 = 34.9 | 21.7 | 0.98 | 32.6 |
|  |  |  | 8.9-39.2-7.8 = 55.9 | 26.6 | 1.42 | 45.2 |
|  |  |  | 15.3-68.8-13.8 = 97.9 | 34.9 | 1.69 | 55.8 |
|  |  |  | 22.4-93.9-18.7 = 135 | 40.9 | 1.69 | 57.6 |
|  | cylindrical | 0.34 | 8.7-28.5-8.9 = 46.1 | 24.8 | 1.40 | 43.7 |
|  | lamellar | 0.37 ± 0.02 | 11.8-37.4-12.6 = 61.8 | 30.4 | 1.12 | 41.9 |
|  |  |  | 18.6-50.0-18.9 = 87.5 | 35.5 | 1.10 | 37.9 |
|  |  |  | 28.4-83.4-28.5 = 140.3 | 45.9 | 1.35 | 41.9 |

| Polymer | Morphology | $\phi_{PS}$ | MW (kg/mol) | d (nm) | $M_{SF}$ (43° C.) | Flux (g/m²-h), t = 50 μm, 43° C. |
|---|---|---|---|---|---|---|
| DCD | lamellar | 0.47 ± 0.04 | 6-13-6 = 25 | 27.7 | 2.00 | 67.6 |
|  |  |  | 12-24-12 = 48 | 41.0 | 2.05 | 64.2 |
|  |  |  | 27-54-27 = 108 | 57.7 | 2.16 | 66.5 |
|  |  |  | 40-75-40 = 155 | 69.8 | 2.16 | 65.1 |

TABLE 10

Summary of Pervaporation Results with SBS and DCD Triblock Copolymers at 43° C.

| Polymer | Morphology | $\phi_{PS}$ | MW (kg/mol) | d (nm) | $M_{SF}$ (43° C.) | Flux (g/m²-h), t = 50 μm, 43° C. |
|---|---|---|---|---|---|---|
| SBS | spherical (bcc) | 0.07 | 4.2-96.8-4.7 = 105.7 | 37.9 | 1.21 | 29.6 |
|  |  |  | 7.0-150.5-8.4 = 165.9 | 51.2 | 1.59 | 35.0 |
|  | cylindrical | 0.2 | 4.6-26.2-3.4 = 34.2 | 19.4 | 0.64 | 17.7 |
|  |  |  | 9.0-47.0-5.7 = 61.7 | 29.6 | 1.23 | 20.6 |
|  |  |  | 14.2-90.9-13.1 = 118.2 | 39.4 | 1.53 | 29.1 |
|  |  |  | 26.6-158.0-22.5 = 207.1 | 55 | 1.57 | 29.5 |
|  | cylindrical | 0.26 | 5.5-24.2-5.2 = 34.9 | 21.7 | 1.02 | 16.7 |
|  |  |  | 8.9-39.2-7.8 = 55.9 | 26.6 | 1.36 | 20.6 |
|  |  |  | 15.3-68.8-13.8 = 97.9 | 34.9 | 1.41 | 23.0 |
|  |  |  | 22.4-93.9-18.7 = 135 | 40.9 | 1.45 | 23.5 |
|  | cylindrical | 0.34 | 8.7-28.5-8.9 = 46.1 | 24.8 | 1.31 | 18.8 |
|  | lamellar | 0.37 ± 0.02 | 11.8-37.4-12.6 = 61.8 | 30.4 | 0.93 | 15.6 |
|  |  |  | 18.6-50.0-18.9 = 87.5 | 35.5 | 0.87 | 15.1 |
|  |  |  | 28.4-83.4-28.5 = 140.3 | 45.9 | 1.11 | 16.3 |
|  |  |  | 6-13-6 = 25 | 27.7 | 2.00 | 67.6 |

TABLE 10-continued

Summary of Pervaporation Results with SBS and DCD Triblock Copolymers at 43° C.

| Polymer | Morphology | $\phi_{PS}$ | MW (kg/mol) | d (nm) | $M_{SF}$ (43° C.) | Flux (g/m²-h), t = 50 µm, 43° C. |
|---|---|---|---|---|---|---|
| DCD | lamellar | 0.47 ± 0.04 | 12-24-12 = 48 | 41.0 | 2.05 | 64.2 |
|  |  |  | 27-54-27 = 108 | 57.7 | 2.16 | 66.5 |
|  |  |  | 40-75-40 = 155 | 69.8 | 2.16 | 65.1 |

ENUMERATED EMBODIMENTS

The following enumerated embodiments are representative of some aspects of the invention.

1. A copolymer of a first cycloalkene monomer and a second cycloalkene monomer, wherein the second cycloalkene monomer is substituted with one or more polydialkylsiloxane groups.

2. The copolymer of embodiment 1, wherein the polydialkylsiloxane groups comprise between 20-60 wt % of the copolymer.

3. The copolymer of either embodiments 1 or 2, wherein the polydialkylsiloxane groups comprise between 35-45 wt % of the copolymer.

4. The copolymer of any of embodiments 1-3, wherein the polydialkylsiloxane is polydimethylsiloxane.

5. The copolymer of any of embodiments 1-4, wherein the first cycloalkene monomer is an optionally substituted ring selected from the group consisting of cyclopentene, cyclohexene, cycloheptene, cyclooctene, cyclononene, cyclodecene, norbornene, and cyclooctadiene.

6. The copolymer of any of embodiments 1-5, wherein the first cycloalkene monomer is optionally substituted cyclooctene.

7. The copolymer of any of embodiments 1-6, wherein a molar ratio of the first cycloalkene monomer and the second cycloalkene monomer in the copolymer is 5-30.

8. The copolymer of any of embodiments 1-7, wherein the molar ratio of the first cycloalkene monomer and the second cycloalkene monomer in the copolymer is 10-20.

9. The copolymer of any of embodiments 1-8, wherein the second cycloalkene monomer is a norbornene substituted with one or more PDMS groups and optionally further substituted.

10. The copolymer of any of embodiments 1-9, wherein the second cycloalkene monomer is 2-polydimethylsiloxyl-5-norbornene.

11. The copolymer of any of embodiments 1-9, wherein the copolymer is a graft copolymer.

12. The copolymer of any of embodiments 1-11, wherein the copolymer is unsaturated.

13. The copolymer of any of embodiments 1-12, wherein the copolymer is saturated.

14. The copolymer of any of embodiments 1-13, wherein the copolymer has a morphology selected from the group consisting of lamellar, cylindrical, double diamond, and gyroid.

15. A composition comprising a ring-opening, olefin metathesis polymerization catalyst and the first cycloalkene monomer and second cycloalkene monomer of any of embodiments 1-6 or 9.

16. A method of synthesizing a copolymer composition comprising reacting the first cycloalkene monomer and second cycloalkene monomer of any of embodiments 1-6 or 9 with a ring-opening, olefin metathesis polymerization catalyst.

17. A copolymer composition synthesized by the method of embodiment 16.

18. A copolymer comprising a block of polymerized cycloalkene monomer and two end groups, the end groups selected from the group consisting of polydialkylsiloxane, poly(alkylacrylate), poly(alkylmethacrylate), and poly(propylene oxide).

19. The copolymer of embodiment 18, wherein the polydialkylsiloxane is polydimethylsiloxane.

20. The copolymer of embodiment 18, wherein the poly(alkylmethacrylate) is poly(n-butylmethacrylate).

21. The copolymer of embodiment 18, wherein the poly(propylene oxide) end groups are (meth)acrylate-terminated.

22. The copolymer of any of embodiments 18-21, wherein the copolymer is a triblock copolymer.

23. The copolymer of any of embodiments 18-22, wherein the cycloalkene monomer is selected from the group consisting of cyclopentene, cyclohexene, cycloheptene, cyclooctene, cyclononene, cyclodecene, cyclooctadiene, and norbornene.

24. The copolymer of any of embodiments 18-23, wherein the cycloalkene monomer is cyclooctene.

25. The copolymer of any of embodiments 18-24, wherein the copolymer has a morphology selected from the group consisting of cylindrical, lamellar, double diamond, and gyroid.

26. The copolymer of any of embodiments 1-25, wherein the copolymer has a domain size of 15-75 nm.

27. A membrane comprising the copolymer of any of embodiments 1-26.

28. The membrane of embodiment 27, wherein the membrane has a thickness of 20-150 µm.

29. The membrane of either embodiment 27 or embodiment 28, wherein the membrane has a thickness of 20-50 µm.

30. The membrane of any of embodiments 27-29, wherein the membrane has a thickness of 1-20 µm and is supported on a support material.

31. A method of selectively separating an alcohol from an aqueous mixture, the method comprising:
(a) providing the membrane of any of embodiments 27-30; and
(b) contacting the aqueous mixture with the membrane whereby the alcohol selective permeates through the membrane by pervaporation or vapor permeation to selectively separate the alcohol from the aqueous mixture.

32. The method of embodiment 31, wherein the membrane comprises a copolymer composition having a morphology selected from the group consisting of lamellar, cylindrical, double diamond, and gyroid.

33. A method of selectively separating an alcohol from an aqueous mixture, the method comprising:
(a) providing an alcohol-selective membrane comprising a copolymer composition having a cylindrical morphology; and
(b) contacting the aqueous mixture with the alcohol-selective membrane whereby the alcohol selectively passes through the membrane by pervaporation or vapor permeation to selectively transport the alcohol from the aqueous mixture.

34. The method of embodiment 33, wherein the alcohol selectivity is at least 5.

35. The method of any of embodiments 31-34, wherein the alcohol selectivity is at least 10.

36. The method of any of embodiments 31-35, wherein the alcohol is ethanol or butanol.

37. The method of any of embodiments 31-36, wherein the alcohol is ethanol.

38. The method of any of embodiments 33-37, wherein the copolymer composition comprises SBS copolymers.

39. The method of any of embodiments 33-38, wherein the copolymer composition has a domain size of 15-75 nm.

40. A copolymer comprising a block of polymerized cycloalkene monomer and two end groups, the end groups selected from the group consisting of polydialkylsiloxane, poly(alkylacrylate), poly(alkylmethacrylate), and poly(propylene oxide).

41. The copolymer of embodiment 40, wherein the polydialkylsiloxane is polydimethylsiloxane.

42. The copolymer of embodiment 40, wherein the poly(alkylmethacrylate) is poly(n-butylmethacrylate).

43. The copolymer of embodiment 40, wherein the poly(propylene oxide) end groups are (meth)acrylate-terminated.

44. The copolymer of any of embodiments 40-43, wherein the copolymer is a triblock copolymer.

45. The copolymer of any of embodiments 40-44, wherein the cycloalkene monomer is selected from the group consisting of cyclopentene, cyclohexene, cycloheptene, cyclooctene, cyclononene, cyclodecene, cyclooctadiene, and norbornene.

46. The copolymer of any of embodiments 40-45, wherein the cycloalkene monomer is cyclooctene.

47. The copolymer of any of embodiments 40-46, wherein the copolymer has a morphology selected from the group consisting of cylindrical, lamellar, double diamond, and gyroid.

48. The copolymer of any of embodiments 40-46, wherein the copolymer has a morphology selected from the group consisting of spherical, cylindrical, and lamellar.

49. A method of selectively separating an alcohol from an aqueous mixture, the method comprising:
(a) providing a membrane comprising the copolymer of any of embodiments 40-48; and
(b) contacting the aqueous mixture with the membrane whereby the alcohol selectively permeates through the membrane by pervaporation or vapor permeation to selectively separate the alcohol from the aqueous mixture.

50. The method of embodiment 49, wherein the membrane comprises a copolymer composition having a morphology selected from the group consisting of lamellar, cylindrical, double diamond, and gyroid.

51. The method of either embodiment 49 or 50, wherein the membrane comprises a copolymer composition having a morphology selected from the group consisting of lamellar and cylindrical.

52. The method of any of embodiments 49-51, wherein the membrane has a separation factor ($M_{SF}$) of 1.0 to 3.0.

53. The method of any of embodiments 49-52, wherein the membrane has a domain spacing of 15-75 nm.

54. The method of any of embodiments 49-53, wherein the membrane has a flux of 50-70 $g/m^2$-h.

55. The method of any of embodiments 49-54, wherein the alcohol selectivity is at least 10.

56. The method of any of embodiments 49-55, wherein the alcohol is ethanol or butanol.

57. The method of any of embodiments 49-56, wherein the alcohol is ethanol.

58. A method of selectively separating an alcohol from an aqueous mixture, the method comprising:
(a) providing a membrane comprising an SBS copolymer composition; and
(b) contacting the aqueous mixture with the alcohol-selective membrane whereby the alcohol selectively passes through the membrane by pervaporation or vapor permeation to selectively transport the alcohol from the aqueous mixture.

59. The method of embodiment 58, wherein the membrane comprises a copolymer composition having a morphology selected from the group consisting of spherical, lamellar, and cylindrical.

60. The method of either embodiment 58 or 59, wherein the membrane comprises a copolymer composition having a cylindrical morphology.

61. The method of any of embodiments 58-60, wherein the membrane has a flux and a domain spacing, and wherein the flux increases as the domain spacing increases.

62. The method of any of embodiments 58-61, wherein the membrane has a separation factor ($M_{SF}$) of 1.0 to 3.0.

63. The method of any of embodiments 58-62, wherein the membrane has a domain spacing of 15-75 nm.

64. The method of any of embodiments 58-63, wherein the membrane has a flux of 10-70 $g/m^2$-h.

65. The method of any of embodiments 58-64, wherein the alcohol selectivity is at least 10.

66. The method of any of embodiments 58-65, wherein the alcohol is ethanol or butanol.

67. The method of any of embodiments 58-66, wherein the alcohol is ethanol.

68. A copolymer of a first cycloalkene monomer and a second cycloalkene monomer, wherein the second cycloalkene monomer is substituted with one or more polydialkylsiloxane groups.

69. The copolymer of embodiment 68, wherein the polydialkylsiloxane groups comprise between 20-60 wt % of the copolymer.

70. The copolymer of either embodiment 68 or 69, wherein the polydialkylsiloxane groups comprise between 35-45 wt % of the copolymer.

71. The copolymer of any of embodiments 68-70, wherein the polydialkylsiloxane is polydimethylsiloxane.

72. The copolymer of any of embodiments 68-71, wherein the first cycloalkene monomer is an optionally substituted ring selected from the group consisting of cyclopentene, cyclohexene, cycloheptene, cyclooctene, cyclononene, cyclodecene, norbornene, and cyclooctadiene.

73. The copolymer of any of embodiments 68-72, wherein the first cycloalkene monomer is optionally substituted cyclooctene.

74. The copolymer of any of embodiments 68-73, wherein a molar ratio of the first cycloalkene monomer and the second cycloalkene monomer in the copolymer is 5-30.

75. The copolymer of any of embodiments 68-74, wherein the molar ratio of the first cycloalkene monomer and the second cycloalkene monomer in the copolymer is 10-20.

76. The copolymer of any of embodiments 68-75, wherein the second cycloalkene monomer is a norbornene substituted with one or more PDMS groups and optionally further substituted.

77. The copolymer of any of embodiments 68-76, wherein the second cycloalkene monomer is 2 polydimethylsiloxyl-5-norbornene.

78. The copolymer of any of embodiments 40-48 or 68-77, wherein the copolymer is a graft copolymer.

79. The copolymer of any of embodiments 40-48 or 68-78, wherein the copolymer is unsaturated.

80. The copolymer of any of embodiments 40-48 or 68-78, wherein the copolymer is saturated.

81. The copolymer of any of embodiments 68-80, wherein the copolymer has a morphology selected from the group consisting of lamellar, cylindrical, double diamond, and gyroid.

82. The copolymer of any of embodiments 68-81, wherein the copolymer has a domain size of 15-75 nm.

83. A composition comprising a ring-opening, olefin metathesis polymerization catalyst and the first cycloalkene monomer and second cycloalkene monomer of embodiment 68.

84. A method of synthesizing a copolymer composition comprising reacting the first cycloalkene monomer and second cycloalkene monomer of embodiment 68 with a ring-opening, olefin metathesis polymerization catalyst.

85. A copolymer composition synthesized by the method of embodiment 84.

86. A method of selectively separating an alcohol from an aqueous mixture, the method comprising:
(a) providing a membrane comprising the copolymer of any of embodiments 68-82; and
(b) contacting the aqueous mixture with the membrane whereby the alcohol selectively permeates through the membrane by pervaporation or vapor permeation to selectively separate the alcohol from the aqueous mixture.

87. The method of embodiment 86, wherein the membrane comprises a copolymer composition having a morphology selected from the group consisting of lamellar, cylindrical, double diamond, and gyroid.

88. The method of either embodiment 86 or 87, wherein the membrane comprises a copolymer composition having a morphology selected from the group consisting of lamellar and cylindrical.

89. The method of any of embodiments 86-88, wherein the membrane has a separation factor ($M_{SF}$) of 1.0 to 3.0.

90. The method of any of embodiments 86-89, wherein the membrane has a domain spacing of 15-75 nm.

91. The method of any of embodiments 86-90, wherein the membrane has a flux of 50-70 $g/m^2$-h.

92. The method of any of embodiments 86-91, wherein the alcohol selectivity is at least 10.

93. The method of any of embodiments 86-92, wherein the alcohol is ethanol or butanol.

94. The method of any of embodiments 86-93, wherein the alcohol is ethanol.

Although the methods and compositions described herein have been described in connection with some embodiments, it is not intended to be limited to the specific form set forth herein. Rather, the scope of the methods and compositions described herein is limited only by the claims. Additionally, although a feature may appear to be described in connection with particular embodiments, one skilled in the art would recognize that various features of the described embodiments may be combined in accordance with the methods and compositions described herein.

Furthermore, although individually listed, a plurality of means, elements or method steps may be implemented by, for example, a single method. Additionally, although individual features may be included in different claims, these may be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Terms and phrases used in this document, and embodiments thereof, unless otherwise expressly stated, should be construed as open ended as opposed to limiting. As examples of the foregoing: the term "including" should be read to mean "including, without limitation" or the like; the terms "example" or "some embodiments" are used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of methods and compositions described herein may be described or claimed in the singular, the plural is contemplated to be within the scope thereof unless limitation to the singular is explicitly stated. The presence of broadening words and phrases such as "one or more," "at least," "but not limited to," "in some embodiments" or other like phrases in some instances shall not be read to mean that the narrower case is intended or required in instances where such broadening phrases may be absent.

In addition, while compositions and methods described herein may be open to inclusion of additional unrecited features, and thus may be described or claimed as 'comprising' the specified features, a composition or process consisting only of the recited features, or consisting essentially of the recited features is expressly within the scope of the invention as well.

REFERENCES

1. Wijmans, J. G.; Baker, R. W. Journal of Membrane Science 1993, 79, 101-113.
2. Wijmans, J. G.; Baker, R. W. Journal of Membrane Science 1995, 107, 1-21.
3. Xia, M.; Kong, Y.; Han, H.; Shi, J.; Ding, L.; Song, C.; Zhang, Y. Reactive & Functional Polymers 2008, 68, 1601.

We claim:

1. A copolymer of a first cycloalkene monomer and a second cycloalkene monomer, wherein the second cycloalkene monomer is substituted with one or more polydialkylsiloxane groups, and wherein the first cycloalkene monomer is optionally substituted cyclooctene.

2. The copolymer of claim 1, wherein the polydialkylsiloxane groups comprise between 35-45 wt % of the copolymer.

3. The copolymer of claim 1, wherein the polydialkylsiloxane is polydimethylsiloxane.

4. The copolymer of claim 1, wherein the molar ratio of the first cycloalkene monomer and the second cycloalkene monomer in the copolymer is 10:1 to 20:1.

5. The copolymer of claim 1, wherein the second cycloalkene monomer is a norbornene substituted with one or more polydimethylsiloxane groups and optionally further substituted.

6. The copolymer of claim 1, wherein the second cycloalkene monomer is 2-polydimethylsiloxyl-5-norbornene.

7. A copolymer of a first cycloalkene monomer and a second cycloalkene monomer, wherein the second cycloalkene monomer is substituted with one or more polydialkylsiloxane groups, and wherein the copolymer has a morphology selected from the group consisting of lamellar, cylindrical, double diamond, and gyroid.

8. A copolymer of a first cycloalkene monomer and a second cycloalkene monomer, wherein the second cycloalkene monomer is substituted with one or more polydialkylsiloxane groups, and wherein the copolymer has a domain size of 15-75 nm.

9. A method of selectively separating an alcohol from an aqueous mixture, the method comprising:
(a) providing a membrane comprising a copolymer of a first cycloalkene monomer and a second cycloalkene monomer, wherein the second cycloalkene monomer is substituted with one or more polydialkylsiloxane groups; and
(b) contacting the aqueous mixture with the membrane whereby the alcohol selectively permeates through the membrane by pervaporation or vapor permeation to selectively separate the alcohol from the aqueous mixture.

10. The method of claim 9, wherein the membrane comprises a copolymer composition having a morphology selected from the group consisting of lamellar, cylindrical, double diamond, and gyroid.

11. The method of claim 9, wherein the membrane comprises a copolymer composition having a morphology selected from the group consisting of lamellar and cylindrical.

12. The method of claim 9, wherein the membrane has a separation factor ($M_{SF}$) of 1.0 to 3.0.

13. The method of claim 9, wherein the membrane has a domain spacing of 15-75 nm.

14. The method of claim 9, wherein the membrane has a flux of 50-70 $g/m^2$-h.

15. The method of claim 9, wherein the alcohol selectivity is at least 10.

16. The method of claim 9, wherein the alcohol is ethanol.

* * * * *